United States Patent
Seok

(10) Patent No.: US 9,794,829 B2
(45) Date of Patent: Oct. 17, 2017

(54) METHOD AND DEVICE FOR TRANSMITTING DATA

(71) Applicant: TECHFLUX, LTD., Seojong-si (KR)

(72) Inventor: Yong H Seok, Irvine, CA (US)

(*) Notice: Subject to any disclaimer, the term of this patent is extended or adjusted under 35 U.S.C. 154(b) by 0 days.

(21) Appl. No.: 15/390,607

(22) Filed: Dec. 26, 2016

(65) Prior Publication Data

US 2017/0105143 A1 Apr. 13, 2017

Related U.S. Application Data

(63) Continuation of application No. PCT/IB2015/001797, filed on Jun. 26, 2015.

(30) Foreign Application Priority Data

| Jun. 27, 2014 | (KR) | 10-2014-0080169 |
| Jun. 27, 2014 | (KR) | 10-2014-0080170 |
| Jun. 27, 2014 | (KR) | 10-2014-0080171 |
| Jun. 27, 2014 | (KR) | 10-2014-0080172 |
| Jun. 27, 2014 | (KR) | 10-2014-0080173 |
| Jun. 27, 2014 | (KR) | 10-2014-0080174 |

(51) Int. Cl.
| H04W 4/00 | (2009.01) |
| H04W 28/06 | (2009.01) |
| H04W 48/10 | (2009.01) |
| H04L 5/00 | (2006.01) |
| H04W 74/08 | (2009.01) |
| H04W 84/12 | (2009.01) |
| H04W 88/08 | (2009.01) |

(52) U.S. Cl.
CPC ........... *H04W 28/06* (2013.01); *H04L 5/0007* (2013.01); *H04W 48/10* (2013.01); *H04W 74/0808* (2013.01); *H04W 84/12* (2013.01); *H04W 88/08* (2013.01)

(58) Field of Classification Search
CPC ... H04W 28/06; H04W 5/0007; H04W 48/10; H04W 74/0808; H04W 84/12; H04W 88/08
See application file for complete search history.

(56) References Cited

U.S. PATENT DOCUMENTS

| 7,016,651 B1 | 3/2006 | Narasimhan |
| 7,054,296 B1 | 5/2006 | Sorrells et al. |
| 7,577,122 B1 | 8/2009 | Schultz et al. |
| 7,929,409 B2 | 4/2011 | Chitrapu et al. |
| 8,284,711 B2 | 10/2012 | Michalson et al. |
| 8,467,331 B2 | 6/2013 | Lakkis |
| 8,531,980 B2 | 9/2013 | Park et al. |
| 8,553,576 B2 | 10/2013 | Park |
| 8,553,730 B2 | 10/2013 | Schmidl et al. |

(Continued)

FOREIGN PATENT DOCUMENTS

| CN | 104333858 A | 2/2015 |
| EP | 01424829 A2 | 6/2004 |

(Continued)

*Primary Examiner* — Abdelnabi O Musa

(57) ABSTRACT

A method and a device for transmitting data in in a wireless local area network are provided. The device supports a multiple basic service set and sends a physical protocol data unit (PPDU). The PPDU includes an identifier used to assist the device in identifying a basic service set.

18 Claims, 26 Drawing Sheets

(56) References Cited

U.S. PATENT DOCUMENTS

| | | | |
|---|---|---|---|
| 8,625,562 B2 * | 1/2014 | Noh | H04W 72/042 370/338 |
| 8,625,690 B2 | 1/2014 | Taghavi Nasrabadi et al. | |
| 8,675,754 B1 | 3/2014 | Yonge, III et al. | |
| 8,687,572 B2 | 4/2014 | Park | |
| 8,761,273 B2 | 6/2014 | Son et al. | |
| 8,767,570 B2 | 7/2014 | Ong et al. | |
| 8,792,325 B1 | 7/2014 | Narasimhan | |
| 8,804,612 B1 | 8/2014 | Chen et al. | |
| 8,824,371 B2 | 9/2014 | Vermani et al. | |
| 8,861,447 B2 | 10/2014 | Kim et al. | |
| 8,879,523 B2 | 11/2014 | Fischer et al. | |
| 8,885,535 B2 | 11/2014 | Fischer et al. | |
| 8,917,705 B2 | 12/2014 | Merlin et al. | |
| 8,923,146 B2 | 12/2014 | Ong et al. | |
| 8,942,123 B2 | 1/2015 | Merlin et al. | |
| 8,964,618 B2 | 2/2015 | Seok | |
| 9,025,428 B2 | 5/2015 | Jones, IV et al. | |
| 2004/0103278 A1 | 5/2004 | Abhishek et al. | |
| 2010/0067363 A1 | 3/2010 | Yu | |
| 2010/0165829 A1 | 7/2010 | Narasimha et al. | |
| 2011/0013575 A1 | 1/2011 | Liao et al. | |
| 2011/0013721 A1 | 1/2011 | Liao et al. | |
| 2011/0096685 A1 | 4/2011 | Lee et al. | |
| 2011/0211462 A1 | 9/2011 | Wu et al. | |
| 2012/0099507 A1 | 4/2012 | Zhang et al. | |
| 2012/0287771 A1 | 11/2012 | Loghin et al. | |
| 2012/0314695 A1 * | 12/2012 | Liu | H04W 28/065 370/338 |
| 2012/0314696 A1 | 12/2012 | Liu | |
| 2013/0155953 A1 | 6/2013 | Chu et al. | |
| 2013/0182593 A1 | 7/2013 | Zhang et al. | |
| 2013/0182599 A1 | 7/2013 | Bachl et al. | |
| 2013/0242769 A1 | 9/2013 | Hammarwall et al. | |
| 2014/0307568 A1 | 10/2014 | Zhang et al. | |
| 2014/0341048 A1 | 11/2014 | Sajadieh et al. | |
| 2015/0264617 A1 | 9/2015 | Choudhury et al. | |
| 2015/0312386 A1 | 10/2015 | Lee et al. | |
| 2015/0358904 A1 | 12/2015 | Kwon et al. | |
| 2015/0373587 A1 * | 12/2015 | Josiam | H04W 28/20 370/338 |
| 2016/0014729 A1 * | 1/2016 | Wentink | H04L 69/323 370/329 |
| 2016/0056929 A1 | 2/2016 | Kwon | |
| 2016/0072654 A1 * | 3/2016 | Choi | H04L 27/2602 370/329 |
| 2016/0080954 A1 | 3/2016 | Hedayat | |
| 2016/0135225 A1 | 5/2016 | Kwon et al. | |
| 2016/0143058 A1 | 5/2016 | Son et al. | |
| 2016/0174254 A1 | 6/2016 | Hedayat | |
| 2016/0183304 A1 | 6/2016 | Fischer et al. | |
| 2016/0242210 A1 | 8/2016 | Seok | |
| 2016/0309357 A1 | 10/2016 | Wong et al. | |

FOREIGN PATENT DOCUMENTS

| | | |
|---|---|---|
| EP | 02930997 A1 | 10/2015 |
| KR | 20150124389 A | 11/2015 |
| KR | 150141903 A | 12/2015 |
| KR | 20160058049 A | 5/2016 |
| KR | 20160021020 A | 8/2016 |
| KR | 20160092502 A | 8/2016 |
| WO | WO-2013085363 A1 | 6/2013 |
| WO | WO-2014010786 A1 | 1/2014 |
| WO | WO-2015186892 A1 | 12/2015 |
| WO | WO-2015198144 A2 | 12/2015 |
| WO | WO-2015198157 A2 | 12/2015 |
| WO | WO-2016006830 A1 | 1/2016 |
| WO | WO-2016087917 A1 | 6/2016 |
| WO | WO-2016089069 A1 | 6/2016 |
| WO | WO-2016107380 A1 | 7/2016 |
| WO | WO-2016112306 A1 | 7/2016 |
| WO | WO-2016122363 A1 | 8/2016 |

* cited by examiner

| | | | | HEW-STF *(-1)* | HEW-LTF *(-1)* | HEW-LTF *(-1)* | ...... | HEW-SIGB*(-1)* |
|---|---|---|---|---|---|---|---|---|
| L-STF *(+j)* | L-LTF *(+j)* | L-SIG *(+j)* | HEW-SIGA *(+j)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |
| | | | | HEW-STF *(-1)* | HEW-LTF *(-1)* | HEW-LTF *(-1)* | ...... | HEW-SIGB*(-1)* |
| L-STF *(+1)* | L-LTF *(+1)* | L-SIG *(+1)* | HEW-SIGA *(+1)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |

FIG. 6

| | | | | HEW-STF *(-1)* | HEW-LTF *(-1)* | HEW-LTF *(-1)* | ...... | HEW-SIGB*(-1)* |
|---|---|---|---|---|---|---|---|---|
| L-STF *(-1)* | L-LTF *(-1)* | L-SIG *(-1)* | HEW-SIGA *(-1)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |
| | | | | HEW-STF *(-1)* | HEW-LTF *(-1)* | HEW-LTF *(-1)* | ...... | HEW-SIGB*(-1)* |
| L-STF *(-1)* | L-LTF *(-1)* | L-SIG *(-1)* | HEW-SIGA *(-1)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |
| | | | | HEW-STF *(-1)* | HEW-LTF *(-1)* | HEW-LTF *(-1)* | ...... | HEW-SIGB*(-1)* |
| L-STF *(-1)* | L-LTF *(-1)* | L-SIG *(-1)* | HEW-SIGA *(-1)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |
| | | | | HEW-STF *(-1)* | HEW-LTF *(-1)* | HEW-LTF *(-1)* | ...... | HEW-SIGB*(-1)* |
| L-STF *(+1)* | L-LTF *(+1)* | L-SIG *(+1)* | HEW-SIGA *(+1)* | HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB*(+1)* |

| Element ID | Length | BSSID index | DTIM period (optional) | DTIM count (optional) |
|---|---|---|---|---|

Octets    1      1      1      0 or 1      0 or 1

METHOD AND DEVICE FOR TRANSMITTING DATA

CROSS-REFERENCE TO RELATED APPLICATIONS

The present application is a Continuation Application (Bypass Continuation Application) of a currently pending international application No. PCT/IB2015/001797 having an international filing date of 26 Jun. 2015 and designating the United States, the international application claiming priority to the following earlier filed Korean patent applications:

No. 10-2014-0080169 filed on Jun. 27, 2014,
No. 10-2014-0080170 filed on Jun. 27, 2014,
No. 10-2014-0080171 filed on Jun. 27, 2014,
No. 10-2014-0080172 filed on Jun. 27, 2014,
No. 10-2014-0080173 filed on Jun. 27, 2014, and
No. 10-2014-0080174 filed on Jun. 27, 2014.

The entire contents of the aforesaid international application and the afore-listed Korean patent applications are incorporated herein by reference. The applicant claims the benefit of and claims priory herein to the aforesaid international application and the afore-listed Korean patent applications and their filing dates and priority dates.

BACKGROUND OF THE INVENTION

Field of the Invention

The present invention relates to wireless communications, and more particularly, to a method and device for transmitting data in a wireless local area network.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for transmitting data in a wireless local area network.

The present invention provides a device for transmitting data in a wireless local area network.

The present invention provides a method for supporting multiple basic service set in a wireless local area network.

The present invention also provides a device for supporting multiple basic service set in a wireless local area network.

In an aspect, a method for supporting multiple basic service set in a wireless local area network is provided. The method includes receiving, by a transmitting station, a first frame from an access point (AP), the first frame including a multiple basic service set identifier (BSSID) information indicating a plurality of BSSIDs to assign a plurality of BSSs, each of the plurality of BSSIDs having 48 bits uniquely identifying a corresponding BSS, receiving, by the transmitting station, a second frame from the AP, the second frame including a first identifier, the first identifier having 3 bits used to assist the transmitting station in identifying at least one of the plurality of BSSs, and transmitting, by the transmitting station, a physical protocol data unit (PPDU) to a receiving station, the PPDU including a signal field, the signal field including a second identifier, the second identifier being set to a value of the first identifier. The value of the first identifier is set to a same value for all of the plurality of BSSs.

The signal field may further include an indication field having one bit indicating that the second identifier is present.

In another aspect, a device configured for supporting multiple basic service set in a wireless local area network is provided. The device includes a radio frequency module configured to transmit and receive radio signals and a processor operatively coupled with the radio frequency module and configured to instruct the radio frequency module to receive a first frame from an access point (AP), the first frame including a multiple basic service set identifier (BSSID) information indicating a plurality of BSSIDs to assign a plurality of BSSs, each of the plurality of BSSIDs having 48 bits uniquely identifying a corresponding BSS, instruct the radio frequency module to receive a second frame from the AP, the second frame including a first identifier, the first identifier having 3 bits used to assist the device in identifying at least one of the plurality of BSSs, and instruct the radio frequency module to transmit a physical protocol data unit (PPDU) to a receiving station, the PPDU including a signal field, the signal field including a second identifier, the second identifier being set to a value of the first identifier. The value of the first identifier is set to a same value for all of the plurality of BSSs.

An access point can manage multiple virtual access points.

Since a greater amount of data can be transmitted during a same time period, a transmission efficiency can be increased. In addition, a Peak-to-Average Power Ratio (PAPR) of a transmitter can be decreased.

BRIEF DESCRIPTION OF THE DRAWINGS

FIG. 2 shows an HEW PPDU format according to an embodiment of the present invention.

FIG. 5 shows an HEW PPDU format in a 20 MHz channel.

FIG. 6 shows an HEW PPDU format in a 40 MHz channel.

FIG. 7 shows an HEW PPDU format in an 80 MHz channel.

FIG. 8 shows a PPDU format according to another embodiment of the present invention.

FIG. 15 shows a Multiple BSSID index element format according to an embodiment of the present invention.

FIG. 16 shows an example of PPDU transmission having an RTS/CTS bandwidth signal.

DESCRIPTION OF EXEMPLARY EMBODIMENTS

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency WLAN (HEW) system. A WLAN system supporting systems used before the HEW system is released is referred to as a legacy system. The HEW system may include an HEW Station (STA) and an HEW Access Point (AP). The term HEW is only for the purpose of distinguishing from the conventional WLAN, and there is no restriction thereon. The HEW system may support IEEE 802.11/a/g/n/ac by providing backward compatibility in addition to the proposed method.

Hereinafter, unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission.

Figure 1:
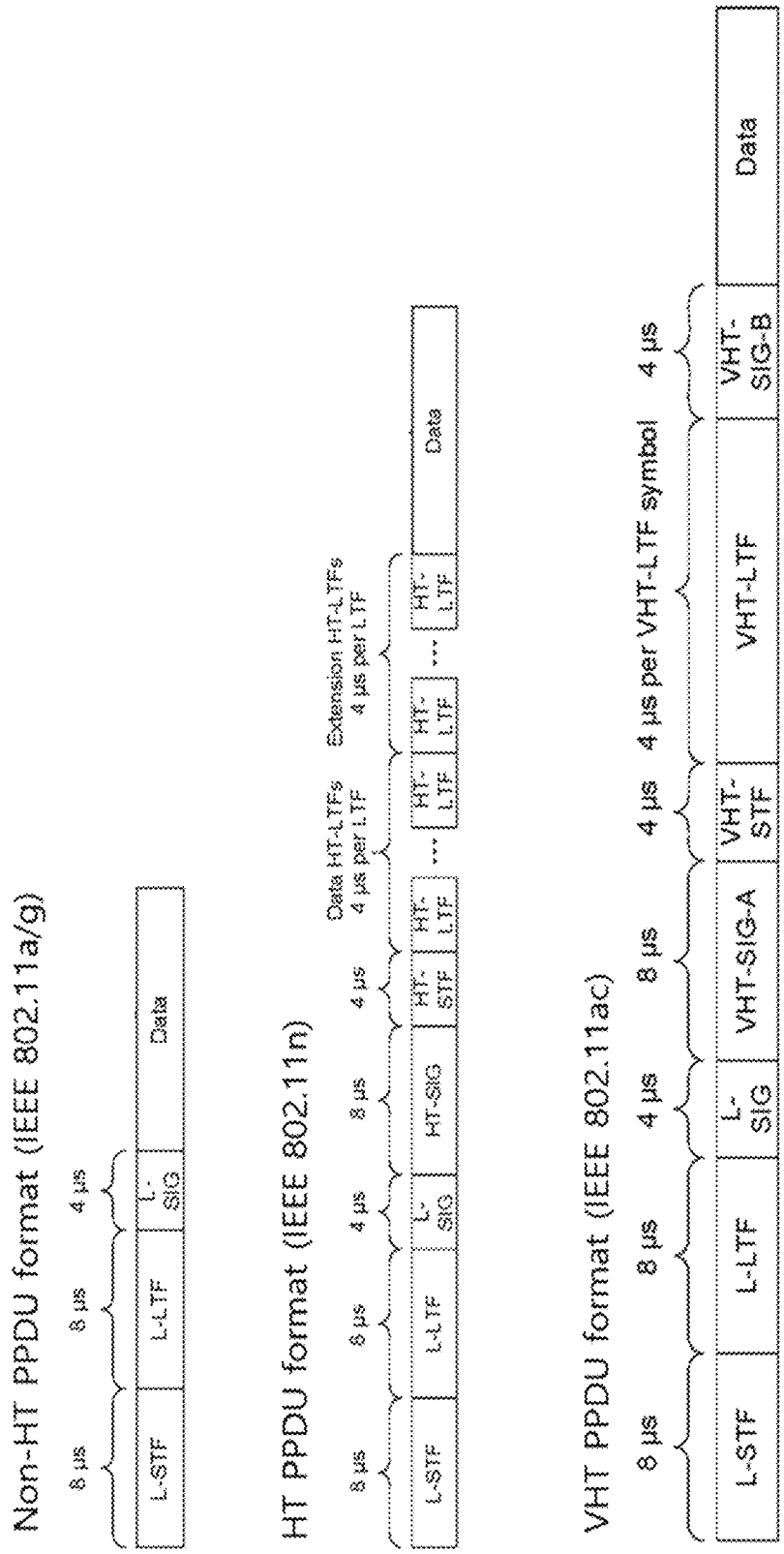
FIG. 1 shows PPDU formats used by the legacy system.

FIG. 1 shows PPDU formats used by the legacy system.

A non-HT PPDU supporting IEEE 802.11a/g includes a Legacy-Short Training Field (L-STF), a Legacy-Long Training Field (L-LTF), and a Legacy-Signal (L-SIG).

An HT PPDU supporting IEEE 802.11n includes a HT-SIG, a HT-STF, and a HT-LTF after the L-SIG.

A VHT PPDU supporting IEEE 802.11ac includes a VHT-SIG-A, a VHT-STF, a VHT-LTF, and a VHT-SIG-B after the L-SIG.

Figure 2:
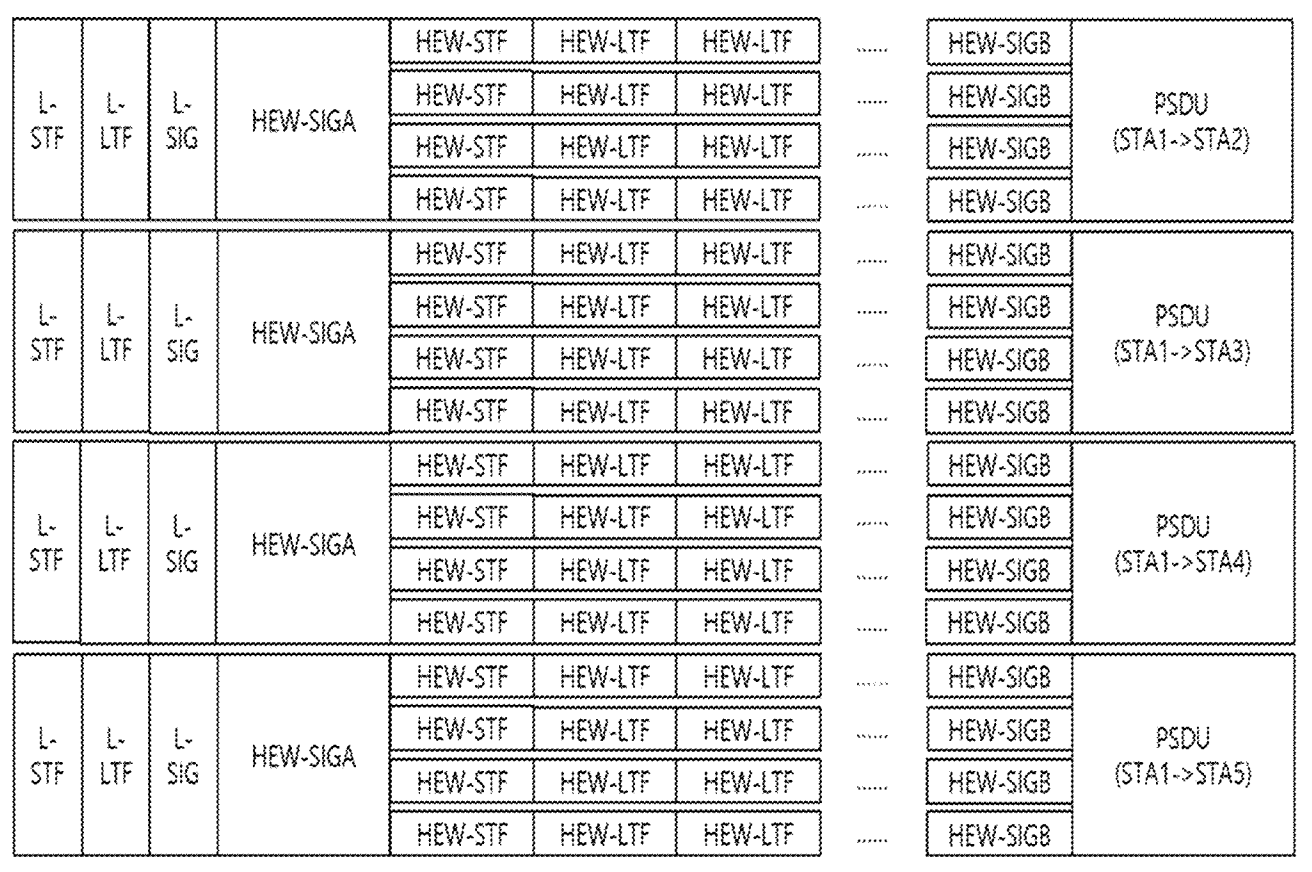

FIG. 2 shows an HEW PPDU format according to an embodiment of the present invention.

An L-STF may be used for frame detection, Automatic Gain Control (AGC), diversity detection, and coarse frequency/time synchronization.

An L-LTF may be used for fine frequency/time synchronization and channel estimation.

An L-SIG may include information indicating a total length of a corresponding PPDU (or information indicating a transmission time of a physical layer protocol service unit (PSDU)).

The L-STF, the L-LTF and the L-SIG may be identical to L-STF, L-LTF and L-SIG of the VHT system. The L-STF, the L-LTF and the L-SIG may be referred to as a legacy portion. The L-STF, the L-LTF, and the L-SIG may be transmitted in at least one Orthogonal Frequency Division Multiplexing (OFDM) symbol generated on the basis of 64-points Fast Fourier Transform (FFT) (or 64 subcarriers) in each 20 MHz channel. For 20 MHz transmission, the legacy portion may be generated by performing an inverse Discrete Fourier Transform (IDFT) with 64 FFT points. For 40 MHz transmission, the legacy portion may be generated by performing an IDFT with 128 FFT points. For 80 MHz transmission, the legacy portion may be generated by performing an IDFT with 512 FFT points.

A HEW-SIGA may include common control information commonly received by an STA which receives a PPDU. The HEW-SIGA may be transmitted in 2 OFDM symbols or 3 OFDM symbols.

The following table exemplifies information included in the HEW-SIGA. A field name or the number of bits is for exemplary purposes only.

TABLE 1

| Field | Bits | Description |
|---|---|---|
| Bandwidth | 2 | Set to 0 for 20 MHz, 1 for 40 MHz, 2 for 80 MHz, 3 for 160 MHz and 80 + 80 MHz mode |
| STBC | 1 | Set to 1 if all streams use STBC, otherwise set to 0. When STBC bit is 1, an odd number of space time streams per user is not allowed. |
| Group ID | 6 | Set to the value of the TXVECTOR parameter GROUP_ID. A value of 0 or 63 indicates a HEW SU PPDU; otherwise, indicates a HEW MU PPDU. |
| Nsts/Partial AID | 12 | For MU: 3 bits/user with maximum of 4 users Set to 0 for 0 space time streams Set to 1 for 1 space time stream Set to 2 for 2 space time streams Set to 3 for 3 space time streams Set to 4 for 4 space time streams Otherwise: first 3 bits contain stream allocation for SU, set to 0 for 1 space time stream, set to 1 for 2 space time streams, etcetera up to 8 streams. Remaining 9 bits contain partial association identifier (AID). |
| No TXOP PS | 1 | Set to 1 to indicate that TXOP PS is not allowed. Set to 0 to indicate that TXOP PS is allowed. Set to the same value in all PPDUs in downlink MU TXOP. |
| GI (Guard interval) | 2 | Set B0 to 0 for Long GI, set to 1 for Short GI. Set B1 to 1 when Short GI. |
| Coding | 2 | For SU: Set B2 to 0 for BCC, set to 1 for LDPC For MU: Set B2 to 0 for BCC, set to 1 for LDPC for 1st user If user 1 has 0 Nsts value, then B2 is reserved and set to 1 |

TABLE 1-continued

| Field | Bits | Description |
|---|---|---|
| MCS | 4 | For SU/Broadcast/Multicast: Modulation and coding scheme (MCS) index<br>For MU:<br>B1: Set to 0 for BCC, 1 for LDPC for the 2nd user<br>B2: Set to 0 for BCC, 1 for LDPC for the 3rd user<br>B3: Set to 0 for BCC, 1 for LDPC for the 4th user<br>If user 2, 3, or 4 has 0 Nsts value, then corresponding bit is reserved and set to 1 |
| SU-Beamformed | 1 | Set to 1 when packet is a SU-beamformed packet<br>Set to 0 otherwise<br>For MU: Reserved, set to 1 |
| CRC | 8 | |
| Tail | 6 | All zeros |

A HEW-STF may be used to improve an AGC estimation in an MIMO transmission.

A HEW-LTF may be used to estimate a MIMO channel. The HEW-LTF may start at the same point of time and may end at the same point of time across all users.

A HEW-SIGB may include user-specific information required for each STA to receive its PSDU. For example, the HEW-SIGB may include information regarding a length of a corresponding PSDU and/or a bandwidth or channel in which the PSDU for a corresponding receiver is transmitted.

A data portion may include at least one PSDU. The position of the HEW-SIGB is illustration purpose only. The HEW-SIGB may be followed by the data portion. The HEW-SIGB may be followed by the HEW-STF or the HEW-LTF.

In the proposed PPDU format, the number of OFDM subcarriers may be increased per unit frequency. The number of OFDM subcarriers may increase K-times by increasing FFT size. K may be 2, 4, or 8. This increase may be accomplished via downclocking (e.g, using a larger FFT size with a same sampling rate).

For example, K=4 downclocking is assumed. As for the legacy portion, 64 FFT is used in a 20 MHz channel, 128 FFT is used in a 40 MHz channel, and 256 FFT is used in an 80 MHz channel. As for a HEW portion using the larger FFT size, 256 FFT is used in a 20 MHz channel, 512 FFT is used in a 40 MHz channel, and 1024 FFT is used in an 80 MHz channel. The HEW-SIGA may have same FFT size as the legacy portion. The HEW portion may have larger FFT size than the legacy portion.

The PPDU is generated by performing IDFT with two different FFT sizes. The PPDU may include a first part with a first FFT size and a second part with a second FFT size. The first part may include at least one of the L-STF, the L-LTF, the L-SIG and the HEW-SIGA. The second part may include at least one of the HEW-STF, the HEW-LTF and the data portion. The HEW-SIGB may be included in the first part or in the second part.

When an FFT size is increased, an OFDM subcarrier spacing is decreased and thus the number of OFDM subcarriers per unit frequency is increased, but an OFDM symbol duration is increased. A guard interval (GI) (or also referred to as a Cyclic Prefix (CP) length) of the OFDM symbol time can be decreased when the FFT size is increased.

If the number of OFDM subcarriers per unit frequency is increased, a legacy STA supporting the conventional IEEE 80.2.11a/g/n/ac cannot decode a corresponding PPDU. In order for the legacy STA and an HEW STA to co-exist, L-STF, L-LTF, and L-SIG are transmitted through 64 FFT in a 20 MHz channel so that the legacy STA can receive the L-STF, the L-LTF, and the L-SIG. For example, the L-SIG is transmitted in a single OFDM symbol, a symbol time of the single OFDM symbol is 4 micro seconds (us), and the GI is 0.8 us.

Although the HEW-SIGA includes information required to decode an HEW PPDU by the HEW STA, the HEW-SIGA may be transmitted through 64 FFT in an 20 MHz channel so that it can be received by both of the legacy STA and the HEW STA. This is to allow the HEW STA to receive not only the HEW PPDU but also the conventional non-HT/HT/VHT PPDU.

Figure 3:
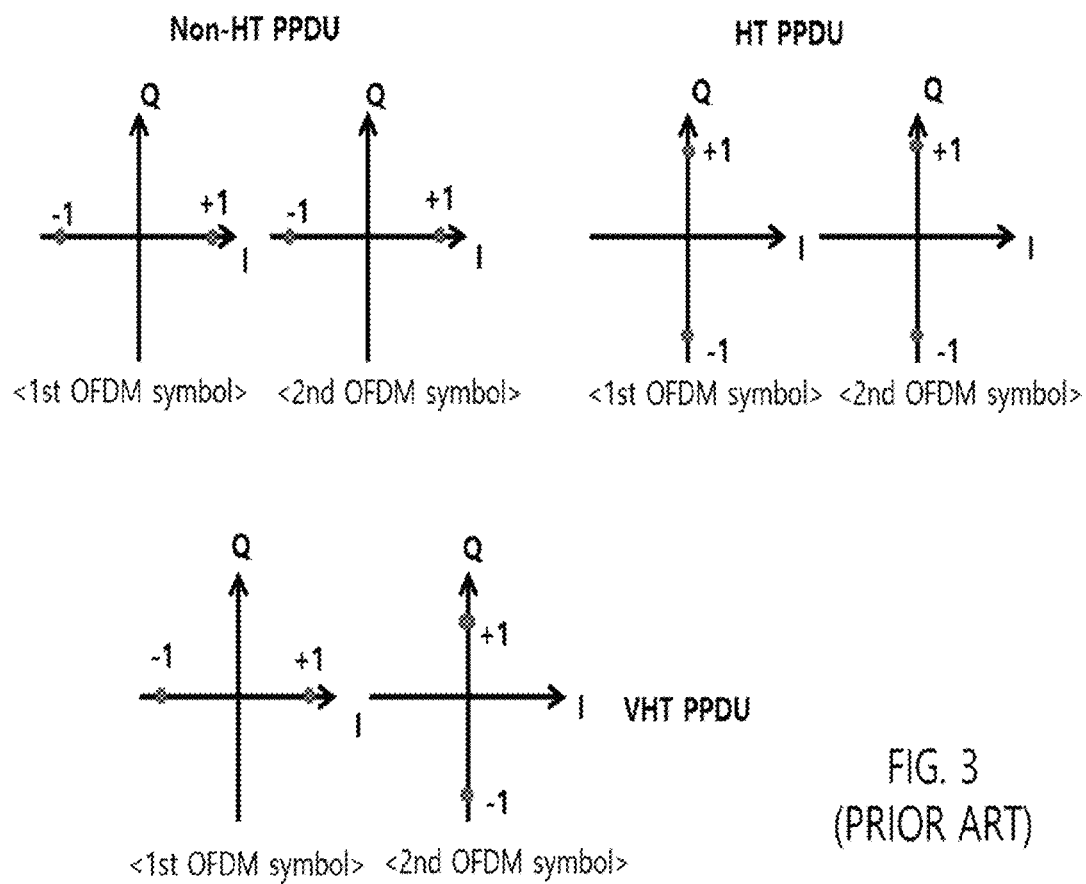
FIG. 3 shows constellation phases for the conventional PPDU.

FIG. 3 shows constellation phases for the conventional PPDU.

To identify a format of a PPDU, a phase of a constellation for two OFDM symbols transmitted after L-STF, L-LTF, and L-SIG is used.

A 'first OFDM symbol' is an OFDM symbol first appeared after the L-SIG. A 'second OFDM symbol' is an OFDM symbol subsequent to the first OFDM symbol.

In a non-HT PPDU, the same phase of the constellation is used in the 1st OFDM symbol and the 2nd OFDM symbol. Binary Phase Shift Keying (BPSK) is used in both of the 1st OFMD symbol and the 2nd OFDM symbol.

In an HT PPDU, although the same phase of the constellation is used in the 1st OFDM symbol and the 2nd OFDM symbol, the constellation rotates by 90 degrees in a counterclockwise direction with respect to the phase used in the non-HT PPDU. A modulation scheme having a constellation which rotates by 90 degrees is called Quadrature Binary Phase Shift Keying (QBPSK).

In a VHT PPDU, a constellation of the first OFDM symbol is identical to that of the non-HT PPDU, whereas a constellation of the second OFDM symbol is identical to that of the HT PPDU. The constellation of second OFDM symbol rotates 90 degrees in a counterclockwise direction with respect to the 1st OFDM symbol. The first OFDM symbol uses BPSK modulation, and the 2nd OFDM symbol uses QBPSK modulation. Since VHT-SIG-A is transmitted after L-SIG and the VHT-SIG-A is transmitted in two OFDM symbols, the first OFDM symbol and the second OFDM symbol are used to transmit the VHT-SIG-A.

Figure 4:
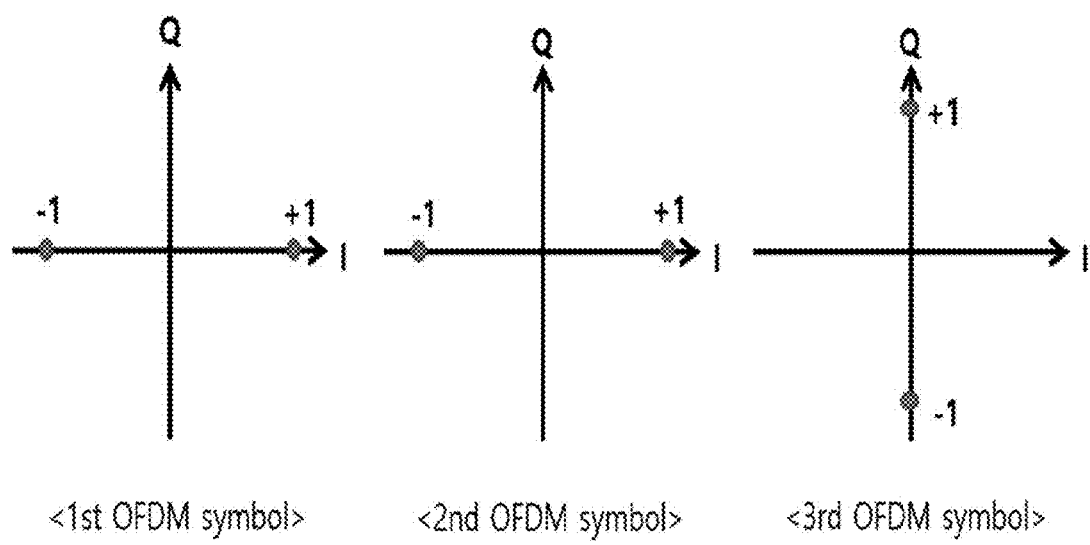
FIG. 4 shows constellation phases for a proposed HEW PPDU.

FIG. 4 shows constellation phases for a proposed HEW PPDU.

To distinguish from a non-HT/HT/VHT PPDU, a constellation of at least one OFDM symbol transmitted after L-SIG can be used.

Just like the non-HT PPDU, a first OFDM symbol and a second OFDM symbol of the HEW PPDU have the same constellation phase. A BPSK modulation may be used for the first OFDM symbol and the second OFDM symbol. The STA can differentiate the HEW PPDU and HT/VHT PPDUs.

In an embodiment, to differentiate the HEW PPDU and the non-HT PPDU, the constellation of a third OFDM symbol can be utilized. The constellation of the third OFDM symbol may rotate by 90 degrees in a counterclockwise direction with respect to the second OFDM symbol. The first and second OFDM symbols may use BPSK modulation, but the third OFDM symbol may use QBPSK modulation.

In another embodiment, the HEW-SIGA may provide an indication about the format of the PPDU. The indication may indicate whether the format of the PPDU is a HEW PPDU. The HEW-SIGA may provide an indication about a use of orthogonal frequency division multiple access (OFDMA).

Hereinafter, a PPDU using a phase rotation in frequency domain is proposed in order to support lower Peak-to-Average Power Ratio (PAPR).

For clarity, it is assumed that the second part (i.e. HEW part) of the PPDU uses 4-times FFT size via downclocking.

Hereinafter, a subchannel refers to a resource allocation unit to be allocated to a STA. Operating bandwidth (i.e. 20 MHz channel, 40 MHz channel, 80 MHz channel or 160 MHz channel) can be divided into a plurality of subchannels. A subchannel may include one or more subcarriers. The plurality of subchannels may have same number of subcarriers or different number of subcarriers. One or more subchannels can be allocated to the STA. The STA can transmit one or more PPDUs through the allocated subchannels. The subchannel may be referred to as 'a subband' or 'a subgroup'.

Figure 5:
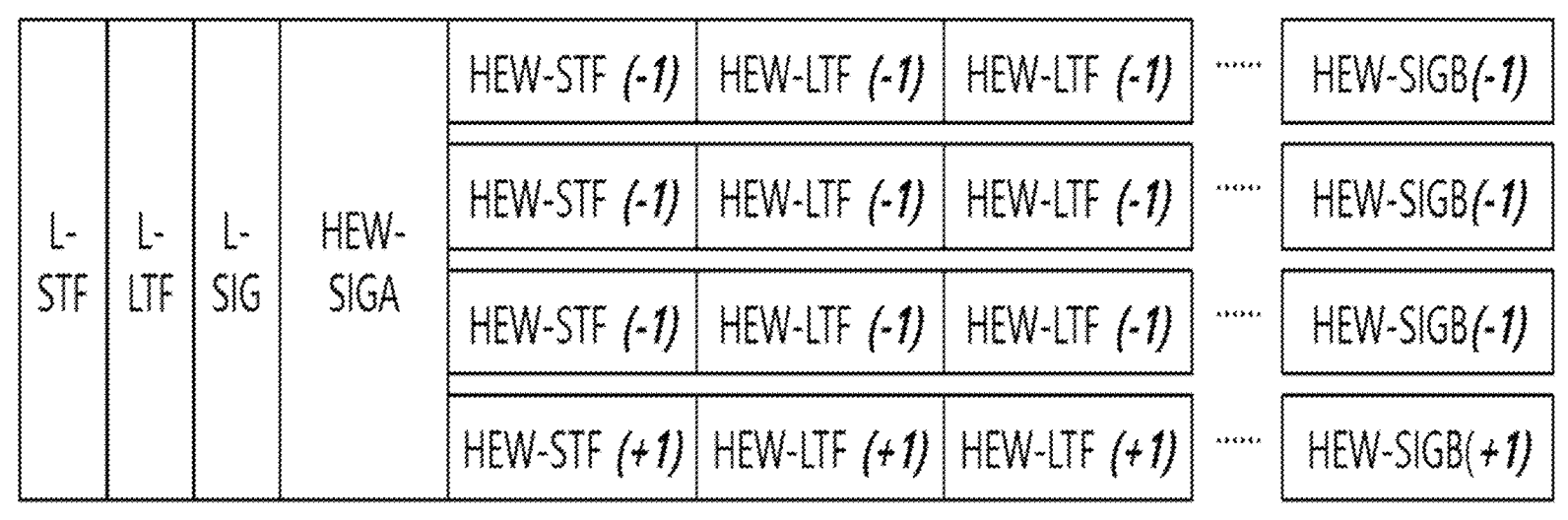

FIG. 5 shows an HEW PPDU format in a 20 MHz channel.

The first part (i.e. L-LTF, L-LTF, L-SIG and HEW-SIGA) uses 64 FFT in the 20 MHz channel. In order to implement the 256 FFT in the second part, it is proposed to decrease an overhead by performing ¼ down-clocking on a VHT 80 MHz PPDU format and by decreasing GI to 0.8 us and 0.4 us.

If the VHT 80 MHz PPDU format is subjected to ¼ down-clocking, an OFDM symbol time is increased by four times, and thus is 16 us when using Long GI, and is 14.4 us when using Short GI. That is, the GI is also increased to 3.2 us in case of Long GI and to 1.6 us in case of Short GI. However, the GI may keep to 0.8 us in case of Long GI and to 0.4 us in case of Short GI. In doing so, after performing the ¼ downclocking, the OFDM symbol time is 13.6 us when using Long GI and is 13.2 us when using Short GI.

If the VHT 80 MHz PPDU format is subjected to ¼ down-clocking in the 20 MHz channel, each of 64 FFT-based VHT-STF, VHT-LTF, and VHT-SIG-B may constitute one subchannel, and as a result, 4 subchannels are combined and transmitted through the 20 MHz channel in unit of 256 FFT.

In FIG. 5, in order to decrease a Peak-to-Average Power Ratio (PAPR) of a transmitter STA, the second part may be subjected to multiplication for a phase waveform in unit of subchannel as follows.

$$R(k) = \begin{cases} -1, k \geq -64 \\ +1, k < -64 \end{cases} \quad \text{[Equation 1]}$$

Herein, R(k) denotes a multiplication value for a phase waveform at a subcarrier index k. 256 subcarriers are divided into 4 subchannels. Respective subchannel is composed of 64 subcarriers. A sequence {+1, −1, −1, −1} may be multiplied for the 4 subchannels, starting from a subchannel having a smallest subcarrier index, that is, a lowermost subchannel. The number of subchannels and the sequence {+1, −1, −1, −1} are exemplary purpose only. 256 subcarriers may be divided into a plurality of subchannels and respective subchannel may be phase-rotated by multiplying +1 or −1.

The equation 1 can be expressed as follows. The 256 subcarriers are divided into first and second subgroups that have different number of subcarriers. The first subgroup is phase-rotated by multiplying +1 and the second subgroup is phase-rotated by multiplying −1.

A sequence constituting the HEW-STF and the HEW-LTF may be as follows.

HEW-STF=1{HTS$_{-58,58}$, 0, 0, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright} where:

$HTS_{-58,58} = \sqrt{1/2}$

{0, 0, 1+j, 0, 0, 0, −1−j, 0, 0, 0, 1+j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 0, 0, 0, 0, 0, 0, 0, 0, 0, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0}

LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 6 shows an HEW PPDU format in a 40 MHz channel.

In order to implement the 512 FFT in the 40 MHz channel, it is proposed to use two blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA are generated using 64 FFT and are transmitted in a duplicated manner two times in the 40 MHz channel. That is, the first part is transmitted in a first 20 MHz subchannel and its duplication is transmitted in a second 20 MHz subchannel.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} +j, k \geq 0 \\ +1, k < 0 \end{cases} \quad \text{[Equation 2]}$$

This means that the first part is phase-rotated by multiplying +1 for the first 20 MHz subchannel and is phase-rotated by multiplying +j for the second 20 MHz subchannel.

The equation 2 can be expressed as follows. The 128 subcarriers are divided into first and second subgroups. The first subgroup is phase-rotated by multiplying +1 and the second subgroup is phase-rotated by multiplying +j.

For each 64 FFT-based subchannel constituting 512 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 64 \leq k \\ +1, 0 \leq k < 64 \\ -1, -192 \leq k < 0 \\ +1, k < -192 \end{cases} \quad \text{[Equation 3]}$$

More specifically, according to Equation 3, 512 subcarriers are divided into 8 subchannels. Respective subchannel is composed of 64 subcarriers. A sequence {+1, −1, −1, −1, +1, −1, −1, −1} may be multiplied for the 8 subchannels, starting from a subchannel having a smallest subcarrier index, that is, a lowermost subchannel.

The equation 3 can be expressed as follows. The 512 subcarriers are divided into four subgroups. The first subgroup is phase-rotated by multiplying +1, the second subgroup is phase-rotated by multiplying −1, the third subgroup is phase-rotated by multiplying +1, and the fourth subgroup is phase-rotated by multiplying −1.

A sequence constituting the HEW-STF and the HEW-LTF may be as follows.

HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$},

HEW-LTF=1{LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright}

Herein, $HTS_{-58,58} = \sqrt{1/2}$

{0, 0, 1+j, 0, 0, 0, −1j, 0, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0, 0, 0, 0, 0, 0, 0, 0, 0, 0, 0, 1+j, 0, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1−j, 0, 0}

LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 7 shows an HEW PPDU format in an 80 MHz channel.

In order to implement the 1024 FFT in the 80 MHz channel, it is proposed to use four blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA which are transmitted using 64 FFT are also transmitted in a duplicated manner four times in the 80 MHz channel. That is, the first part is transmitted in a first 20 MHz subchannel and its duplications are transmitted in second, third and fourth 20 MHz subchannels respectively.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} -1, k \geq -64 \\ +1, k < -64 \end{cases}$$ [Equation 4]

This means that the first part is phase-rotated by multiplying +1 for the first 20 MHz subchannel and is phase-rotated by multiplying −1 for the second, third and fourth 20 MHz subchannels.

The equation 4 can be expressed as follows. The 256 subcarriers are divided into first and second subgroups that have different number of subcarriers. The first subgroup is phase-rotated by multiplying +1 and the second subgroup is phase-rotated by multiplying −1.

For each 64 FFT-based subchannel constituting 1024 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 256 \leq k \\ +1, 192 \leq k < 256 \\ -1, 64 \leq k < 192 \\ +1, 0 \leq k 64 \\ -1, -192 \leq k < 0 \\ +1, 256 \leq k \leq -192 \\ -1, -448 \leq k < -256 \\ +1, k < -448 \end{cases}$$ [Equation 5]

More specifically, according to Equation 5, 1024 subcarriers are divided into 16 subchannels. Respective subchannel is composed of 64 subcarriers. A sequence {+1, −1, −1, −1, +1, −1, −1, −1, +1, −1, −1, −1, +1, −1, −1, −1} may be multiplied for the 16 subchannels, starting from a subchannel having a smallest subcarrier index, that is, a lowermost subchannel.

The equation 5 can be expressed as follows. The 1024 subcarriers are divided into 8 subgroups. The first subgroup is phase-rotated by multiplying +1, the second subgroup is phase-rotated by multiplying −1, the third subgroup is phase-rotated by multiplying +1, the fourth subgroup is phase-rotated by multiplying −1, the fifth subgroup is phase-rotated by multiplying +1, the sixth subgroup is phase-rotated by multiplying −1, the seventh subgroup is phase-rotated by multiplying +1 and the eighth subgroup is phase-rotated by multiplying −1.

A sequence constituting the HEW-STF and the HEW-LTF is as follows.

HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$},

HEW-LTF=1{LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright}, Herein, $HTS_{-58,58} = \sqrt{1/2}$ {0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1j, 0, 0, 0, 1+j, 0, 0, 0, 0, 0, 0, 0, 0, 0, 0, 0, 0, 0, 0, −1−j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, 0, −1−j, 0, 0, 0, −1−j, 0, 0, 0, 1+j, 0, 0, 0, 1+j, 0, 0, 0, 1+j, 0, 0, 0 1+j, 0, 0}

LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}

An FFT size can be increased to improve PPDU transmission efficiency. In order to provide compatibility with the legacy STA, the first part (STF, LTF, L-SIG and HEW-SIGA) using the same FFT size as the legacy PPDU is first transmitted, and subsequently the second part (HEW-STF, HEW-LTF, HEW-SIGB and a PSDU) using a larger FFT size are transmitted.

In order to decrease a PAPR of a transmitter STA, the first part and the second part uses different phase rotation in frequency domain. It means that a phase rotation for subcarriers in the first part is different from a phase rotation for subcarriers in the second part.

Figure 8:
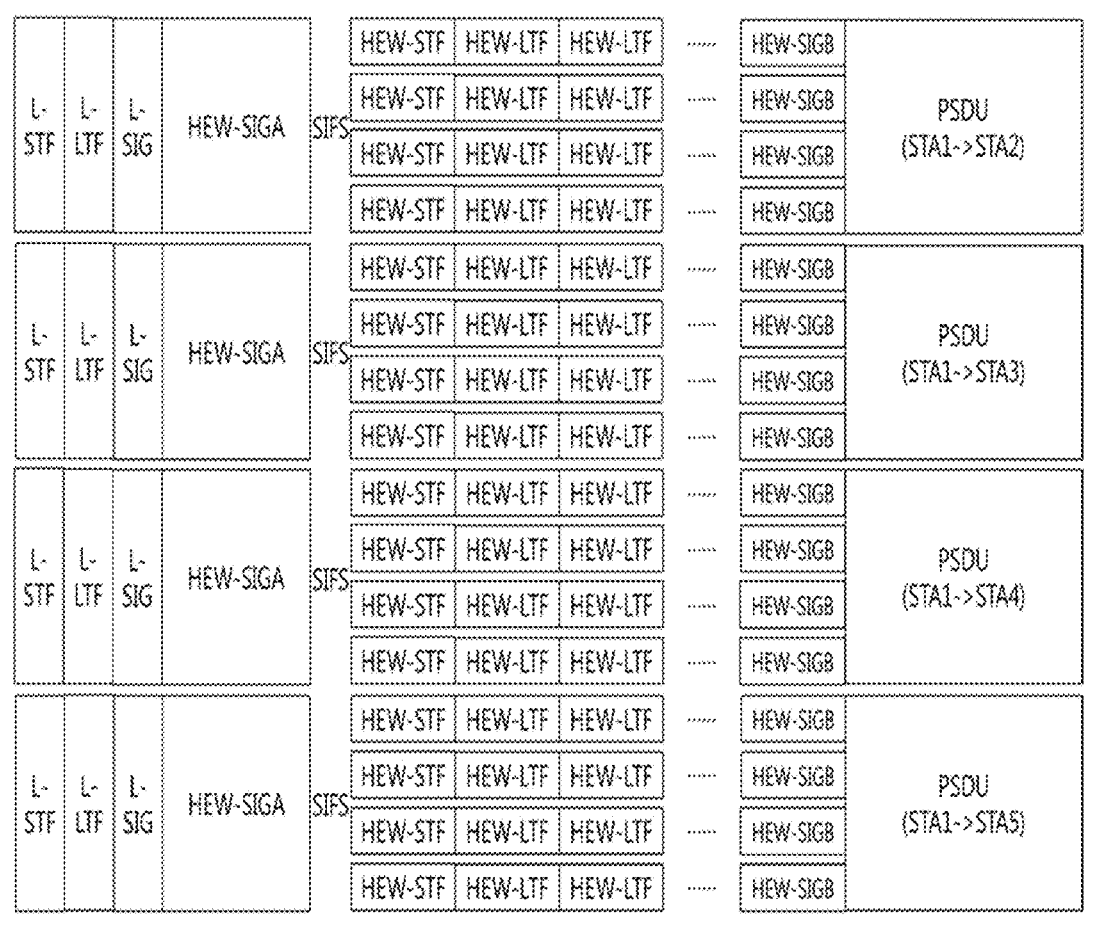

FIG. 8 shows a PPDU format according to another embodiment of the present invention.

Since the number of OFDM subcarriers per unit frequency increases after transmitting L-STF, L-LTF, L-SIG, and HEW-SIGA, a processing time may be required to process data with larger FFT size. The processing time may be called an HEW transition gap.

In an embodiment, the HEW transition gap may be implemented by defining a Short Inter-Frame Space (SIFS) followed by the HEW-STF. The SIFS may be positioned between the HEW-SIGA and the HEW-STF. The SIFS may be positioned between the HEW-SIGB and the HEW-STF.

In another embodiment, the HEW transition gap may be implemented in such a manner that the HEW-STF is transmitted one more time. The duration of the HEW-STF may vary depending on the processing time or STA's capability. If the processing time is required, the duration of the HEW-STF may become double.

Hereinafter, a proposed bandwidth signaling is described.

A transmitter STA may transmit a Request To Send (RTS) frame to a destination STA before transmitting an HEW PPDU. Further, the transmitter STA may receive a Clear To Send (CTS) frame from the destination STA as a response. A transmission bandwidth of the HEW PPDU may be determined using a bandwidth signal through RTS/CTS exchange between the transmitter STA and the destination STA.

If the transmitter STA performs Clear Channel Assessment (CCA) and if it is determined that a 40 MHz channel is idle, the RTS frame is transmitted through the 40 MHz channel. The destination STA receives the RTS frame only in the 20 MHz channel if only the 20 MHz channel is idle, and the destination STA responds with the CTS frame to the transmitter STA in the 20 MHz channel. Since the transmitter STA transmits the RTS frame through the 40 MHz channel but receives the CTS frame as a response only in the 20 MHz channel, a transmission bandwidth of an HEW PPDU may be less than or equal to a channel bandwidth in which a response is received using the CTS frame.

Figure 9:
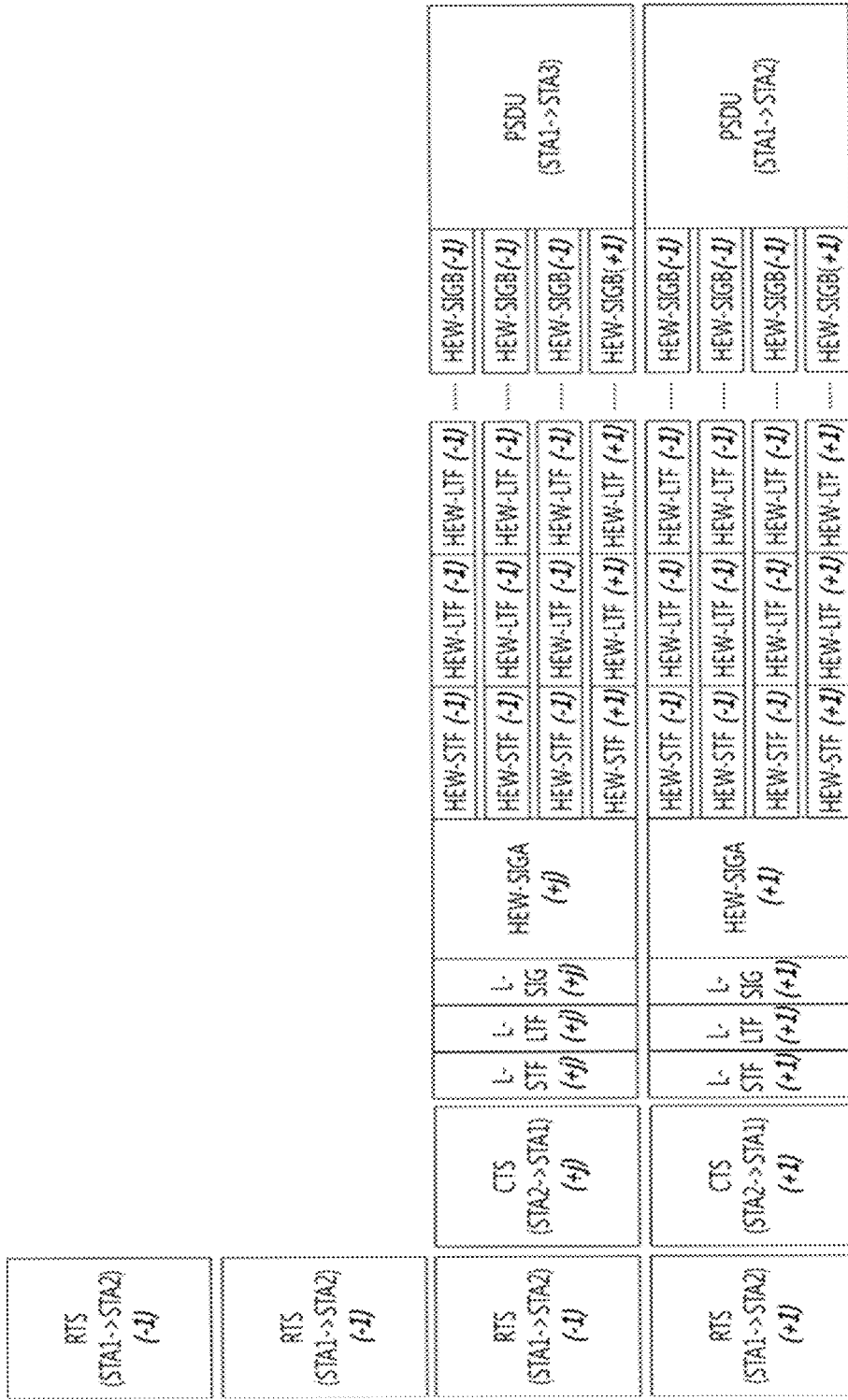
FIG. 9 shows bandwidth signaling according to an embodiment of the present invention.

FIG. 9 shows bandwidth signaling according to an embodiment of the present invention. An STA1 is a transmitter STA, and an STA2 is a destination STA.

Before transmitting an HEW PPDU, the STA1 transmits an RTS frame to the STA2, and receives a CTS frame from the STA2. The STA1 performs CCA, and since it is determined that an 80 MHz channel is idle, transmits the RTS frame through the 80 MHz channel in unit of 20 MHz channel in a duplicated manner. That is, four 20 MHz RTS frames (i.e., one 20 MHz RTS frame and three duplicated RTS frames) are transmitted at an 80 MHz band. For the purpose of decreasing a PAPR of an STA for transmitting the RTS frame, a value of {1, −1, −1, −1} may be multiplied each 20 MHz channel.

In the STA2, only a 40 MHz channel is idle and thus the RTS frame is received only through the 40 MHz channel. The STA2 responds with the CTS frame to the STA1 in the 40 MHz channel.

Although the STA1 transmits the RTS frame through the 80 MHz channel, the CTS frame is received only through the 40 MHz channel. Therefore, a transmission bandwidth of an HEW PPDU transmitted at a later time may be set to a 40 MHz channel bandwidth at which a response is received using the CTS frame.

The CTS frame may also be transmitted in a duplicated manner in unit of 20 MHz. For the purpose of decreasing a PAPR of the STA2 for transmitting a plurality of CTS frames, a value of {1, j} may be multiplied each 20 MHz channel.

The HEW PPDU can be transmitted simultaneously to a plurality of destination STAs by a transmitter STA by independently dividing a channel. In FIG. 9, as to a PSDU transmitted by the STA1, one PSDU is transmitted to the STA2 by using the lowermost 20 MHz channel, and at the same time, another PSDU is transmitted to an STA3 by using a 20 MHz channel thereon. However, optionally, it is also possible that the transmitter STA, i.e., STA1, performs transmission to only one destination STA without having to independently divide all available channels.

When the HEW PPDU is simultaneously transmitted to a plurality of destination STAs by independently dividing a channel, a channel bandwidth of each PSDU addressed to each destination STA may be limited to be less than or equal to a channel bandwidth in which a response is received using the CTS frame. Also, a sum of channel bandwidths of all PSDUs in the HEW PPDU may be limited to be less than or equal to a channel bandwidth in which a response is received using the CTS frame. After exchanging RTS/CTS frame, the HEW PPDU being simultaneously transmitted to a plurality of destination STAs may have a PSDU addressed to a STA responding a CTS frame. In FIG. 9, because the STA2 responds with the CTS frame, the PSDU addressed to the STA2 is included in the HEW PPDU.

A phase rotation sequence of a HEW PPDU may be determined based on a transmission bandwidth of the HEW PPDU. A phase rotation sequence of a HEW PPDU transmitted to either a single destination STA or transmitted to a plurality of destination STAs is same when the transmission bandwidth of the HEW PPDU is identical. In FIG. 9, an HEW PPDU using 512 FFT in a 40 MHz channel is applying the same phase rotation sequence as described in FIG. 6 although the PSDUs of HEW PPDU are addressed to a plurality of destination STAs.

When the HEW PPDU is transmitted at the 2.4 GHz band, RTS/CTS needs to be transmitted through a non-OFDM frame for compatibility with the legacy STA supporting IEEE 802.11b/g.

Figure 10:
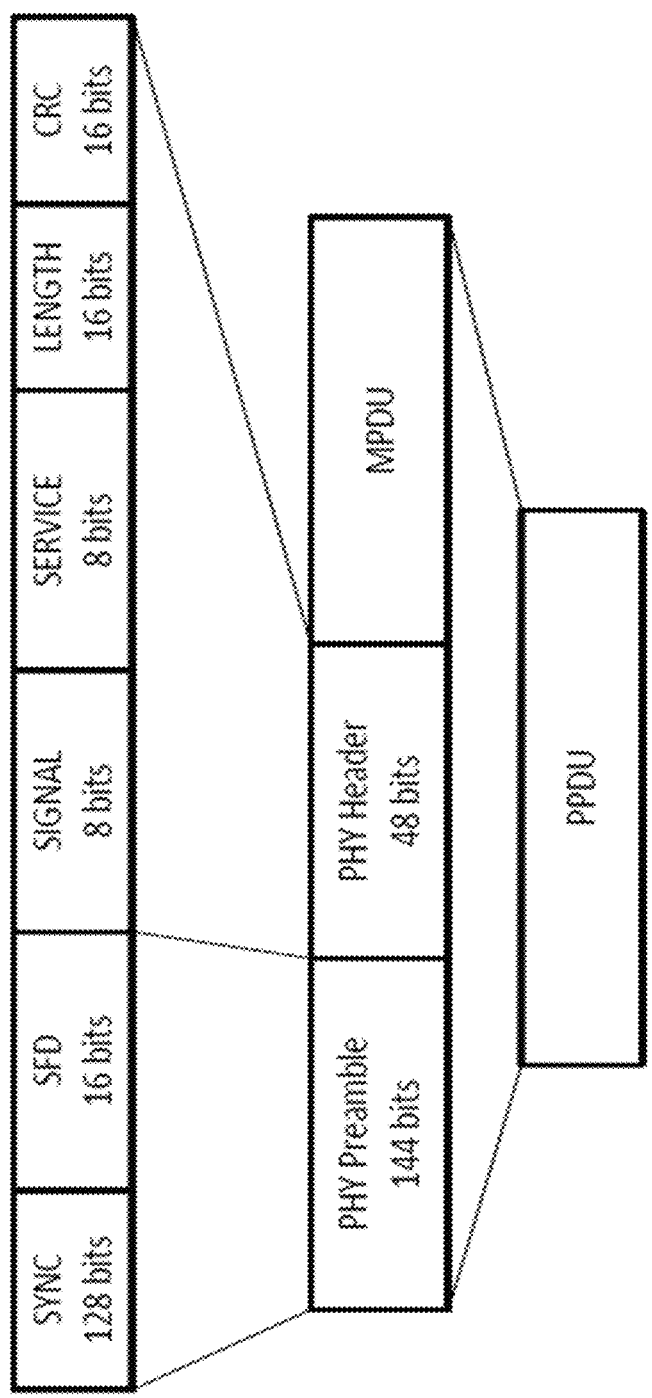
FIG. 10 shows a Direct Sequence Spread Spectrum (DSSS) PPDU format used in IEEE 802.11b/g.

FIG. 10 shows a Direct Sequence Spread Spectrum (DSSS) PPDU format used in IEEE 802.11b/g.

If an RTS/CTS frame is transmitted with the DSSS PPDU format, a channel bandwidth at which the RTS/CTS frame is transmitted is encoded in an 8-bit SERVICE field as follows.

TABLE 2

| B0 | B1 | B2 | B3 | B4 | B5 | B6 | B7 |
|---|---|---|---|---|---|---|---|
| Reserved | Reserved | Locked clocks bit. 0 = not, 1 = locked | | CH_BANDWIDTH_ IN_NON_HT | | DYN_ BANDWIDTH_ IN_NON_HT | Length extension bit |

A value CH_BANDWIDTH_IN_NON_HT is included in B4-B5 of the SERVICE field, and is encoded as follows.

TABLE 3

| CH_BANDWIDTH_IN_NON_HT | Value |
|---|---|
| CBW5 | 0 |
| CBW20 | 1 |
| CBW40 | 2 |
| CBW80 | 3 |

When the transmitter STA transmits an RTS frame, CH_BANDWIDTH_IN_NON_HT is encoded in such a manner that the full channel bandwidth which is used to transmit the RTS frame since it is determined to be currently idle has a value of 5 MHz, 20 MHz, 40 MHz, and 80 MHz. When the destination STA responds with a CTS frame, CH_BANDWIDTH_IN_NON_HT is encoded in such a manner that the full channel bandwidth which is used to transmit the CTS frame since it is determined to be currently idle has a value of 5 MHz, 20 MHz, 40 MHz, and 80 MHz.

A flag value 'DYN_BANDWIDTH_IN_NON_HT' is included in B6 of the SERVICE field, and indicates whether a dynamic channel bandwidth signal is used through RTS/CTS. If the dynamic channel bandwidth signal is used, it implies that a DATA frame of an HEW PPDU can be transmitted with a channel bandwidth less than the full channel bandwidth of an RTS first transmitted by the transmitter STA. Therefore, when the destination STA responds with the CTS frame, it is possible to respond with the CTS even if a channel bandwidth determined to be currently idle is less than the full channel bandwidth of the RTS. However, if the dynamic channel bandwidth signal is not used, it implies that the DATA frame of the HEW PPDU cannot be transmitted with a channel bandwidth less than the full channel bandwidth of the RTS first transmitted by the transmitter STA. Therefore, it implies that, when the destination STA responds with the CTS frame, it is not allowed to respond with the CTS frame if the channel bandwidth determined to be currently idle is less than the full channel bandwidth of the RTS.

Meanwhile, control frames (e.g., RTS frame, CTS frame, ACK frame, Block ACK frame, CF-END frame) include a duration field which plays a role of protecting frames to be transmitted subsequently. For example, the duration field may indicate a remaining Transmission Opportunity (TXOP) duration or may indicate an estimated time required for the transmission of the following frame. If a receiving STA is not a destination STA of the received frame, the receiving STA can set a Network Allocation Vector (NAV) during the time indicated by the duration field. When the NAV is set, the STA considers the channel is busy and does not access the channel.

In general, control frames (e.g., RTS frame, CTS frame, ACK frame, Block ACK frame, CF-END frame) are transmitted with a legacy PPDU format so that the control frames can be received by all STAs. However, if the control frames are transmitted through an HEW PPDU, a GROUP ID field and PARTIAL AID field of an HEW SIGA are respectively set to 63 and 0 in the HEW PPDU. In case of frames other than the control frames, the GROUP ID and PARTIAL AID field are configured as shown in the following table:

TABLE 4

| Condition | Group ID | Partial AID |
|---|---|---|
| Addressed to AP | 0 | BSSID[39:47] |
| Sent by an AP and addressed to a STA associated with that AP | 63 | (dec(AID[0:8]) + dec(BSSID[44:47] XOR BSSID[40:43]) × $2^5$) mod $2^9$ | where XOR is a bitwise exclusive OR operation, mod X indicates the X-modulo operation, dec(A[b:c]) is the cast to decimal operator where b is scaled by $2^0$ and c by $2^{c-b}$.

A basic service set (BSS) may include a set of STAs that have successfully synchronized with an AP. A basic service set identifier (BSSID) is a 48 bits identifier of a corresponding BSS.

The reason of setting the GROUP ID field and PARTIAL AID field of the HEW SIGA respectively to 63 and 0 with respect to the control frames is to allow STAs other than a destination STA to receive a corresponding control frame and to correctly configure an NAV through a duration field. The receiving station can be, for example, a destination station in the present example embodiments disclosed herein.

In the control frame (e.g., RTS frame, CTS frame, ACK frame, Block ACK frame, CF-END frame, etc.) transmitted to an AP, the GROUP ID and PARTIAL_AID of the HEW SIGA are respectively set to 63 and 0 other than 0 and BSSID[39:47]. This means that, even if the GROUP ID and PARTIAL AID values of the frame received by the AP are respectively set to 63 and 0 other than 0 and BSSID[39:47], the AP must process the frame instead of filtering the frame out. In the control frame (e.g., RTS frame, CTS frame, ACK frame, Block ACK frame, CF-END frame, etc.) transmitted to the AP, the GROUP ID and PARTIAL AID field of the HEW SIGA are respectively set to 63 and 0 other than 0 and BSSID[39:47]. This also means that, even if a GROUP_ID and PARTIAL_AID field value of a frame received by an STA are respectively to 63 and 0 other than 63 and (dec (AID[0:8])+dec(BSSID[44:47] XOR BSSID[40:43])×$2^5$) mod $2^9$, the STA must process the frame instead of filtering the frame out.

A COLOR value is used for identifying the BSS, and the number of bits thereof is less than that of a BSSID. For example, the BSSID may be 48 bits, whereas the COLOR value may be 3 bits. The BSSID has the same format as a MAC address, whereas the COLOR value is any value reported in advance by the AP to the STA.

A COLOR field indicating the COLOR value may be included in an HEW-SIGA. In order to report whether the COLOR field is present, the HEW-SIGA may further include a COLOR indication field. For example, if the COLOR indication field is set to 0, it indicates that the COLOR field is present in the HEW-SIGA. If the COLOR indication field is set to 1, it indicates that the COLOR field is not present in the HEW-SIGA.

If the COLOR field is included as an identifier for identifying a BSS in the HEW SIGA, the COLOR field may be set to a specific value such as 0.

If a received frame has the COLOR field which is set to a specific value such as 0, this implies that the received frame needs not to be filtered out but to be processed.

As described above, in the HEW PPDU format, the transmitter STA can perform simultaneous transmission to the plurality of destination STAs by independently divided channels. In addition, for the purpose of bandwidth signaling through an RTS/CTS frame, the RTS/CTS frame may be transmitted as a PPDU format in each subchannel.

Figure 11:
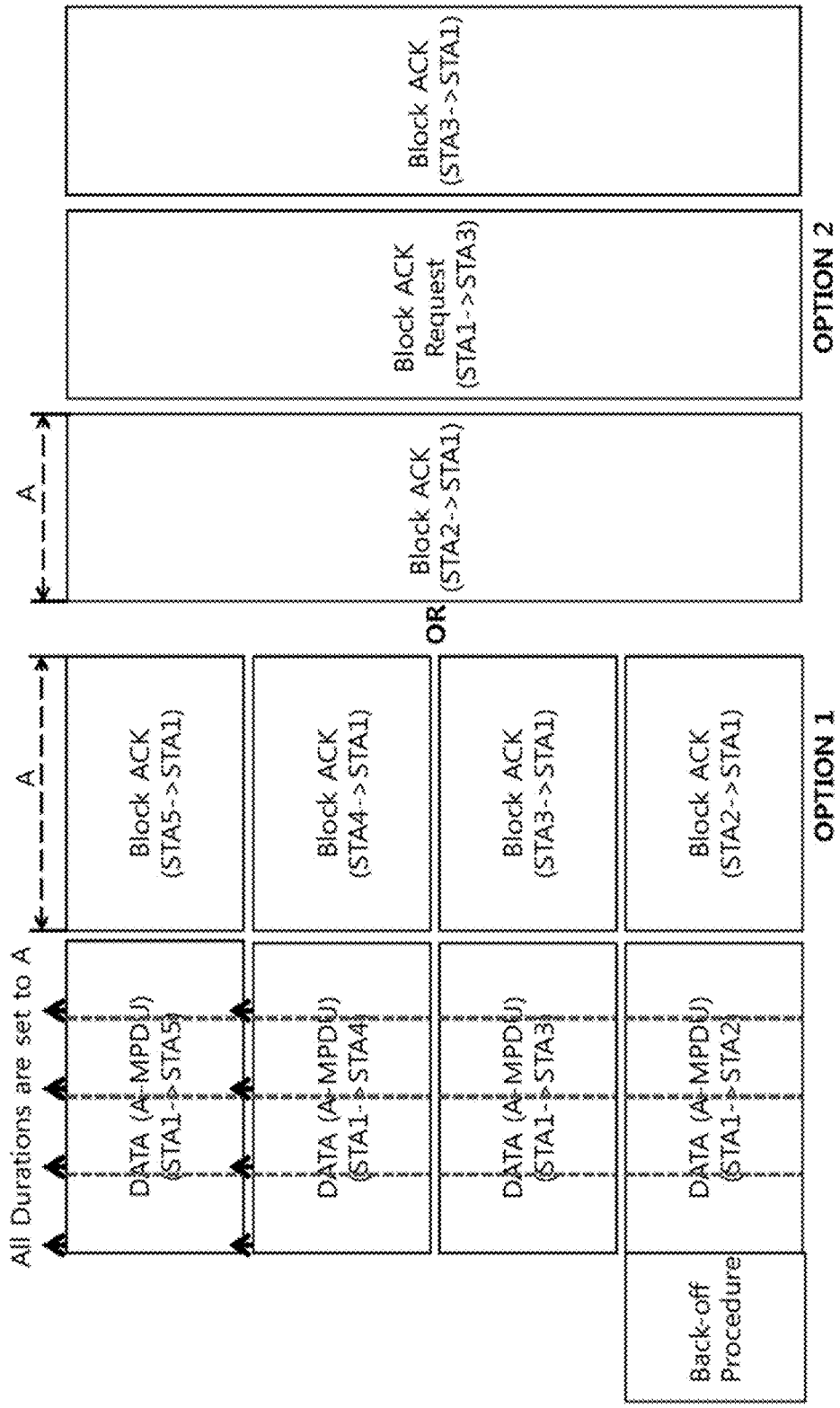
FIG. 11 shows data transmission according to an embodiment of the present invention.

FIG. 11 shows data transmission according to an embodiment of the present invention.

This is a case where a transmitter STA transmits a PPDU to a plurality of destination STAs by independently dividing a channel. The transmitter STA STA1 can perform simultaneously transmission to the plurality of destination STAs by independently dividing the channel. This is a downlink OFDMA case if the STA1 is regarded as an AP.

The STA1 performs a back-off procedure in a primary channel (a channel shown in a lowermost portion in FIG. 11), and thereafter transmits a PPDU. The transmitter STA needs to perform transmission to the plurality of destination STAs, i.e., the STAs 2, 3, 4, and 5, during same transmission time. The PPDU may include a plurality of PSDUs for the plurality of destination STAs. In order to make PSDUs have same transmission time, the PPDU is generated as an aggregated medium access control (MAC) protocol data unit (A-MPDU). A Null A-MPDU having a length of 0 is attached to adjust the transmission time to be equal to each other.

After the plurality of destination STAs receive the PPDU, each destination STA transmits a response frame (e.g., block ACK) to the STA1. The response frame transmitted by each destination STA to the STA1 must also be transmitted with same transmission time.

There may be two options to transmit the response frame. In a first option, the plurality of destination STAs simultaneously transmit the response frame to the transmitter STA by independently dividing a channel. In a second option, each destination STA transmits the response frame sequentially to the transmitter STA by using a full channel bandwidth. In order to support the sequential response frame transmission from each destination STA, the transmitter STA transmits a response request frame such as a block ACK request.

When the destination STA transmits the response frame to the STA1, a transmission bandwidth of the response frame may be less than a transmission bandwidth of the PPDU transmitted by the STA1. A transmission bandwidth for subsequent PPDU transmission of the transmitter STA may be less than or equal to the transmission bandwidth of the response frame.

As shown in FIG. 11, duration fields of MPDUs in an A-MPDU may be set to same values. Comparing A-MPDUs to be transmitted to STA4 and STA5, duration fields of MPDUs constituting an A-MPDU for the STA4 are set to 'A'. In addition, duration fields of MPDUs constituting an A-MPDU for the STA5 are also set to 'A'. That is, in a case where the transmitter STA performs simultaneous transmission to the plurality of destination STAs by independently dividing a channel, the duration fields of the MPDUs have the same values in two aspects, i.e., in PPDUs to be transmitted to different destination STAs and in PPDUs to be transmitted to one destination STA. Also those two aspects can be interpreted as follows: in PPDUs to be transmitted on different channels and in PPDUs to be transmitted on same channel.

If a STA receives PPDUs transmitted in different channels and the PPDUs have the same TA field in a MAC header, this is a case where the transmitter STA performs simultaneous transmission to the plurality of destination STAs by independently dividing the channel. If an error occurs in a PPDU in a certain channel, a duration field of the erroneous PPDU cannot be known. The STA may obtain a duration field of the erroneous PPDU from a duration field of another PPDU currently received in a different channel. Therefore, in this case, this means that a DCF Interframe Space (DIFS) can be used without having to use an Extended Inter-Frame Space (EIFS) when a corresponding STA performs a channel access procedure.

In a case where an error occurs in a frame received during a channel access procedure of an STA and thus a duration field cannot be read, the EIFS is a value used for channel access deferring by providing an inter-frame space as a value greater than or equal to a transmission time of an ACK control frame for the purpose of protecting an ACK control frame which can be transmitted at a later time. On the other hand, the DIFS implies a minimum inter-frame space provided in a channel access procedure in normal data frame transmission.

Figure 12:
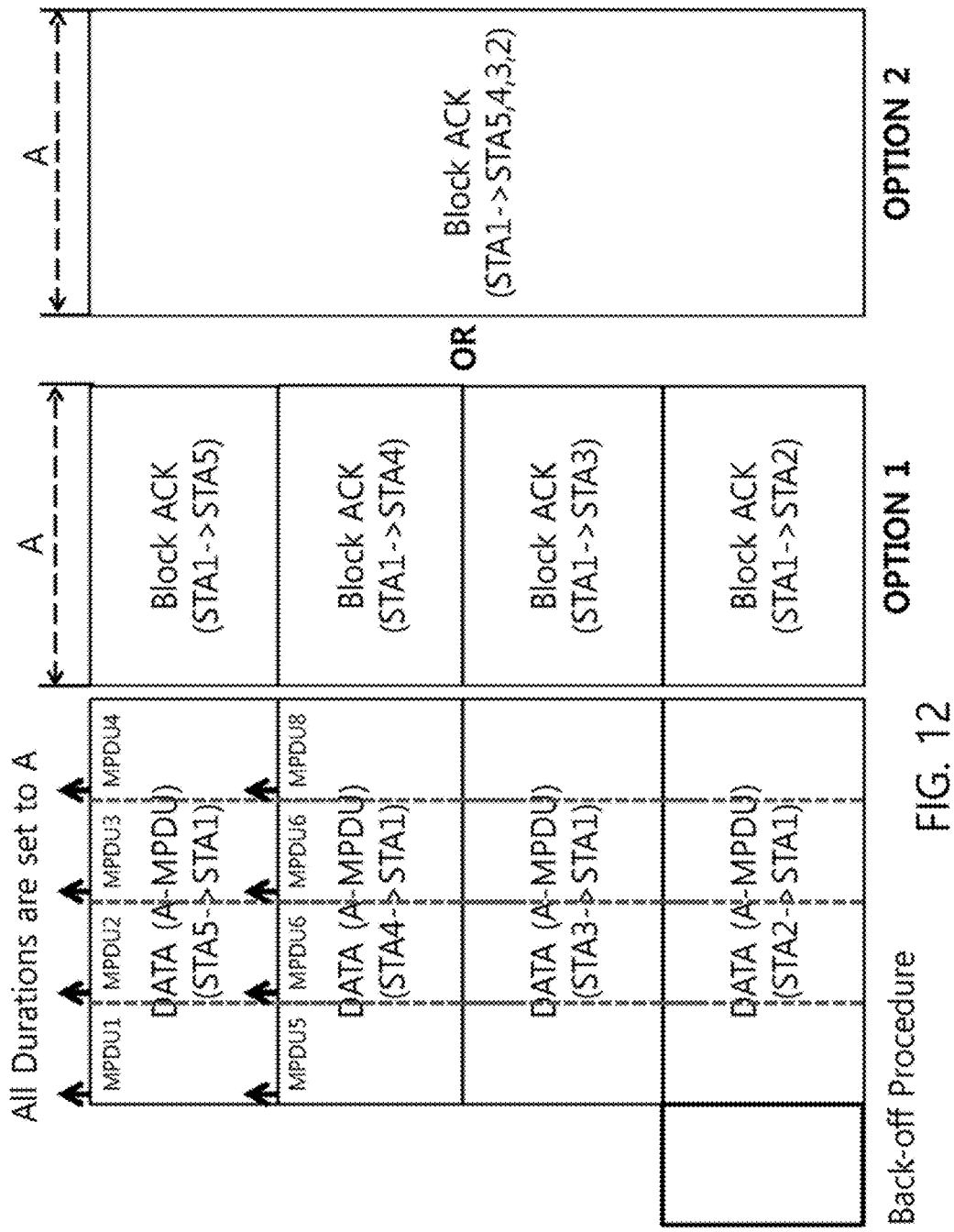
FIG. 12 shows data transmission according to another embodiment of the present invention.

FIG. 12 shows data transmission according to another embodiment of the present invention.

A plurality of transmitter STAs perform simultaneous transmission to one destination STA by independently dividing a channel, which is identical to an uplink OFDMA case if an STA1 is regarded as an AP.

An STA2 performs a back-off procedure in a primary channel (a channel shown in a lowermost portion in FIG. 12), and thereafter transmits a PPDU. In this case, the transmitter STAs correspond to STAs 3, 4, and 5, and perform simultaneous transmission by independently dividing each channel. The plurality of transmitter STAs must perform simultaneous transmission to one designation STA, i.e., the STA1, during same transmission time. STA2, 3, 4 and 5 may transmit a plurality of PPDUs to one destination STA. In order to make PPDUs have same transmission time, respective PPDU is generated as an A-MPDU. A Null A-MPDU having a length of 0 is attached to adjust the transmission time to be equal to each other.

After one destination STA receives the PPDUs, the destination STA transmits a response frame (e.g., block ACK) to each transmitter STA. The response frames are transmitted by the destination STA to each transmitter STA with a same transmission time.

There may be two options to transmit the response frames. In a first option, the destination STA simultaneously transmits the response frames to the plurality of transmitter STAs by independently dividing the channel. In a second option, the destination STA configures one block ACK frame for the plurality of transmitter STAs and transmits the frame in a broadcast manner by using a full channel bandwidth.

When the destination STA transmits the response frame to the transmitter STAs, a transmission bandwidth of the response frame may be less than or equal to a sum of transmission bandwidths of the PPDUs transmitted by the transmitter STAs. A transmission bandwidth for subsequent PPDU transmission of the transmitter STAs may be less than or equal to the transmission bandwidth of the response frame.

As shown in FIG. 12, the duration fields of MPDUs transmitted by transmitter STAs may be set to the same values. Comparing A-MPDUs transmitted by STAs 4 and 5, duration fields of MPDUs constituting an A-MPDU transmitted by the STA4 are set to 'A'. In addition, duration fields of MPDUs constituting an A-MPDU transmitted by the STA5 are also set to 'A'. That is, in a case where the plurality of transmitter STAs perform simultaneous transmission to one destination STA by independently dividing a channel, the duration fields of the MPDUs have the same value in two aspects, i.e., in PPDUs transmitted by different transmitter STAs and in PPDUs transmitted by one transmitter STA. Also those two aspects can be interpreted as follow: in PPDUs transmitted on different channels and in PPDUs transmitted on same channel.

If a STA receives PPDUs transmitted in different channels and the PPDUs have the same RA field in a MAC header or the same partial AID in a PLCP header, this is a case where the plurality of transmitter STAs perform simultaneous transmission to one destination STA by independently dividing the channel. If an error occurs in a PPDU in a certain channel, a duration field of the erroneous PPDU cannot be known. The STA may obtain a duration field value of the erroneous PPDU from a duration field of another PPDU currently received in a different channel. Therefore, in this case, this means that a DIFS can be used without having to use an EIFS when a corresponding STA performs a channel access procedure.

Now, a channel access mechanism is described according to an embodiment of the present invention. It is proposed to adjust a Clear Channel Assessment (CCA) sensitivity level.

A basic service set (BSS) may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

When an STA performs the channel access mechanism, it is first determined whether a channel state of a 20 MHz primary channel is idle/busy. If the channel state is idle, a frame is directly transmitted after a Distributed Inter-Frame Space (DIFS) elapses. Otherwise, if the channel state is busy, the frame is transmitted after performing a back-off procedure.

In the back-off procedure, a STA selects any random number in the range between 0 to Contention Window (CW) and sets the number as a back-off timer. If a channel is idle during a back-off slot time, the back-off timer is decremented by 1. When the back-off timer reaches 0, the STA transmits the frame.

In the channel access mechanism, a PHY-CCA.indication primitive is utilized as a means for determining whether the channel state is idle or busy. When the channel state is idle or busy in a Physical layer (PHY) entity, the PHY-CCA.indication primitive is called out and state information is delivered from the PHY entity to a MAC entity.

According to the section 7.3.5.12 of IEEE P802.11-REVmc/D2.0, PHY-CCA.indication is described as follows.

7.3.5.12 PHY-CCA.indication
7.3.5.12.1 Function
This primitive is an indication by the PHY to the local MAC entity of the current state of the medium and to provide observed IPI values when IPI reporting is turned on.

7.3.5.12.2 Semantics of the service primitive
The primitive provides the following parameters:

PHY-CCA.indication(
STATE,
IPI-REPORT,
channel-list
)

The STATE parameter can be one of two values: BUSY or IDLE. The parameter value is BUSY if the assessment of the channel(s) by the PHY determines that the channel(s) are not available. Otherwise, the value of the parameter is IDLE.

The IPI-REPORT parameter is present if dot11RadioMeasurementActivated is true and if IPI reporting has been turned on by the IPI-STATE parameter. The IPI-REPORT parameter provides a set of IPI values for a time interval. The set of IPI values may be used by the MAC sublayer for Radio Measurement purposes. The set of IPI values are recent values observed by the PHY entity since the generation of the most recent PHYTXEND. confirm, PHY-RXEND.indication, PHY-CCARESET.confirm, or PHY-CCA. indication primitive, whichever occurred latest.

When STATE is IDLE or when, for the type of PHY in operation, CCA is determined by a single channel, the channel-list parameter is absent. Otherwise, it carries a set indicating which channels are busy. The channel-list parameter in a PHY-CCA. indication primitive generated by a HEW STA contains at most a single element. The channel-list parameter element defines the members of this set.

In the PHY-CCA. indication primitive, the channel state is determined to be busy in the following conditions.

TABLE 5

| Operating Channel Width | Channel Busy Conditions |
|---|---|
| 20 MHz, 40 MHz, 80 MHz, 160 MHz, or 80 + 80 MHz | The start of a 20 MHz non-HT or HT or VHT PPDU in the primary 20 MHz channel at or above −82 dBm. The start of a 20 MHz HEW PPDU in the primary 20 MHz channel at or above −82 + Δ dBm. |
| 40 MHz, 80 MHz, 160 MHz, or 80 + 80 MHz | The start of a 40 MHz non-HT duplicate or HT or VHT PPDU in the primary 40 MHz channel at or above −79 dBm. The start of a 40 MHz HEW PPDU in the primary 20 MHz channel at or above −79 + Δ dBm. |
| 80 MHz, 160 MHz, or 80 + 80 MHz | The start of an 80 MHz non-HT duplicate or VHT PPDU in the primary 80 MHz channel at or above −76 dBm. The start of an 80 MHz HEW PPDU in the primary 20 MHz channel at or above −76 + Δ dBm. |
| 160 MHz or 80 + 80 MHz | The start of a 160 MHz or 80 + 80 MHz non-HT duplicate or VHT PPDU at or above −73 dBm. The start of a 160 MHz HEW PPDU in the primary 20 MHz channel at or above −73 + Δ dBm. |

In the Table above, when an adjusting parameter A is a positive number, this means that a threshold value for determining whether a channel state of an HEW STA which receives an HEW PPDU is idle/busy is greater than a threshold value for determining this when the conventional legacy PPDU (e.g., a non-HT/HT/VHT PPDU) is received. That is, a threshold value for determining that a channel state is busy as to a frame received from other BSS (i.e. an OBSS AP/STA) may be set to greater than a threshold value for same BSS. The greater threshold value may result in a decrease in a service coverage of corresponding OBSS transmission.

In order to configure a small BSS in which a service coverage of the BSS is decreased, the adjusting parameter A may be set to a value greater than or equal to 3.

In order to adjust a CCA sensitivity level as such, there is a need for a method capable of identifying a BSS of received frames since frames can be received from various kinds of BSSs. That is, there is a need to identify whether a currently received frame is transmitted by a STA belonging to the different BSS (i.e. the OBSS AP/STA) or a STA belonging to the same BSS. For example, this is because the determining of the channel state to be idle by increasing the CCA sensitivity level may eventually result in a collision and thus may cause deterioration in throughput performance, if the currently received frame is transmitted by a different STA belonging to the same BSS to an AP or is transmitted by the AP to the different STA belonging to the same BSS.

Increasing the CCA sensitivity has a purpose of improving throughput performance by making frequent simultaneous transmissions and using a Modulation Coding Scheme (MCS) with a high tolerant to an interference caused from the OBSS AP/STA.

A STA becomes a member of a BSS for an AP by establishing a connection with the AP. The STA can receive information about a BSSID from the AP. To perform the CCA, the STA can adjust its CCA sensitivity level. If a received PPDU is transmitted from same BSS with the BSS of the STA, the CCA sensitivity level may be set to a first threshold for determining whether a channel state of a received PPDU is idle/busy. If a received PPDU is transmitted from different BSS with the BSS of the STA, the CCA sensitivity level may be set to a second threshold for determining whether a channel state of a received PPDU is idle/busy. The second threshold is different from the first threshold. The second threshold may be greater than the first threshold. The second threshold may be 3 dBm or more greater than the first threshold.

When a STA is failed to identify whether a currently received frame is transmitted by a STA belonging to the different BSS or a STA belonging to the same BSS (e.g., PHY header error and non-HT or HT PPDU reception), the CCA sensitivity level may be set to a first threshold for determining whether a channel state of a received PPDU is idle/busy.

An embodiment of the present invention proposes to define a COLOR field to identify a BSS. The COLOR field is used for identifying the BSS, and the number of bits thereof is less than that of a BSSID. For example, the BSSID may be 48 bits, whereas the COLOR bit may be 3 bits. The BSSID has the same format as a MAC address, whereas the COLOR field is any value reported in advance by the AP to the STA.

Figure 13:
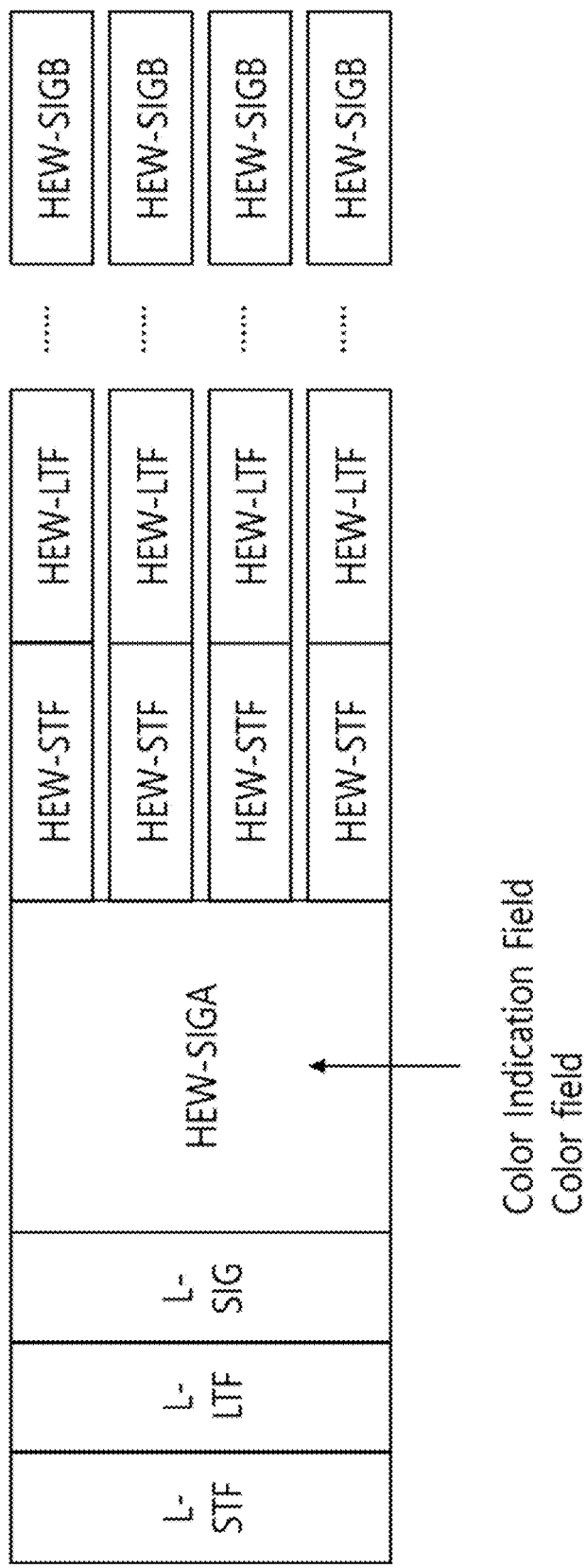
FIG. 13 shows an HEW PPDU format according to an embodiment of the present invention.

FIG. 13 shows an HEW PPDU format according to an embodiment of the present invention.

A COLOR field indicating a COLOR value may be included in an HEW-SIGA. In order to report whether the COLOR field is present, the HEW-SIGA may further include a COLOR indication field. For example, if the COLOR indication field is set to 0, it indicates that the COLOR field is present in the HEW-SIGA. If the COLOR indication field is set to 1, it indicates that the COLOR field is not present in the HEW-SIGA.

The COLOR value may be allocated by an AP to each STA. Information regarding the allocated COLOR value may be included in a beacon frame, a probe response frame, and an association response frame.

A group ID and a partial AID may be utilized as a method of indicating COLOR bits:

TABLE 6

| Condition | Group ID | Partial AID |
|---|---|---|
| Addressed to AP | 0 | BSSID[39:47] |
| Sent by an AP and addressed to a STA associated with that AP | 63 | $(dec(AID[0:8]) + dec(BSSID[44:47]$ XOR $BSSID[40:43]) \times 2^5)$ mod $2^9$ | where XOR is a bitwise exclusive OR operation, mod X indicates the X-modulo operation, $dec(A[b:c])$ is the cast to decimal operator where b is scaled by $2^0$ and c by $2^{c-b}$.

An association identifier (AID) represents the 16-bit identifier assigned by an AP during association. A partial AID is a non-unique 9-bit STA identifier and is obtained from the AID.

When the STA transmits a frame to the AP, the group ID has a value of 0 and the partial AID has a value of BSSID[39:47]. In doing so, as to the frame addressed to the AP, it is possible to identify whether the frame is transmitted from an STA belonging to the same BSS or an STA belonging to the different BSS. Therefore, in case of an uplink frame, it is possible to reuse the partial AID on the behalf of the COLOR bits.

In case of a frame transmitted by the AP to the STA, the group ID is 63, and the partial AID may be determined as follows.

$$(dec(AID[0:8])+dec(BSSID[44:47] \text{XOR } BSSID[40:43]) \times 2^5) \text{ mod } 2^9 \qquad \text{[Equation 6]}$$

The partial AID has a value between 1 to 511. In this case, it is not possible to identify whether a corresponding frame is transmitted by an AP belonging to the same BSS or an AP belonging to the different BSS.

Therefore, in case of a downlink unicast frame, the partial AID cannot be reused with the COLOR bits, and thus the HEW-SIGA needs to have the COLOR field.

If an HEW AP overhears a frame having a value of a group ID 63 and a partial AID in the range of 1 to 511, the HEW AP can acknowledge whether the frame is transmitted by an OBSS AP to a different OBSS STA or the frame is transmitted directly between STAs belonging to the same BSS. In other words, if an HEW STA overhears a frame having the group ID 63 and the partial AID in the range of 1 to 511, the HEW STA cannot know whether the frame is transmitted by the AP belonging to the same BSS or by the OBSS AP. However, the HEW AP can confirm that the frame is transmitted from the OBSS STA if it is known that STAs to which direction communication (e.g., a Direct Link Setup (DLS) or a Tunneled Direct Link Setup (TDLS)) was established in a BSS and if a partial AID of the received frame is not identical to a partial AID of a peer STA to which direct communication was established. In addition, in this case, a channel access mechanism may be continued by increasing a CCA sensitivity level.

However, if the partial AID of the received frame is identical to the partial AID of the peer STA, the HEW AP may follow one of two procedures as follows.

First, if the channel access mechanism is continued by increasing the CCA sensitivity level but a back-off timer expires, the HEW AP may transmit a frame to another STA other than STAs which have the partial AID of the received frame.

Second, the channel access mechanism may be deferred until expected direct communication is completed.

A COLOR value of a BSS may be delivered to the HEW STA through a beacon frame, a probe response frame, and a (re)-association response frame. Alternatively, the HEW STA may overhear any frame belonging to the BSS and may extract the COLOR value from the overheard frame. If a STA knows the COLOR value of the BSS, the STA may set the COLOR value in the HEW-SIGA for a frame to be transmitted to another STA belonging to the BSS.

Least Significant Bit (LSB) 3 bits of the partial AID or Most Significant Bit (MSB) 3 bits thereof may be utilized as the COLOR value. In this case, as one embodiment for a legacy STA, for example, a HEW AP can calculate a partial AID in the same manner as shown in Equation 6 when the HEW AP sends a frame to a VHT STA.

The HEW AP may allocate an AID of the STA such that LSB 3 bits or MSB 3 bits have the same COLOR value. The AP may send a PPDU1 with the COLOR field and a COLOR indication field that is set to 0. The AP may send to a VHT STA a PPDU2 with a COLOR indication field that is set to 1. A HEW STA which overhears the PPDU2 does not acquire any COLOR information from the PPDU2. This is because the AP may allocate an AID of a legacy STA in a conventional manner without considering the COLOR value.

In case of a broadcast/multicast frame transmitted by the AP to all STAs, a group ID is set to 63 and a partial AID is set to 0. Since the group ID and the partial AID have the same value irrespective of a BSS, it is not possible to identify whether the frame is transmitted from an AP belonging to the same BSS or an OBSS AP. Accordingly, in case of a downlink broadcast/multicast frame, a partial AID cannot be reused with COLOR bits, and thus the HEW-SIGA needs to have COLOR 3 bits.

However, this may be limited to the HEW STA. If the HEW AP overhears a frame having a group ID 63 and a partial AID 0, it can be confirmed that the frame is transmitted from the OBSS AP. In other words, if the HEW STA overhears the frame having the group ID 63 and the partial AID 0, the HEW STA cannot know whether the frame is transmitted from the AP belonging to the same BSS or the OBSS AP. However, the HEW AP can determine this, and thus a channel access mechanism can be continued by increasing a CCA sensitivity level.

When it is known that the currently received frame is transmitted from different BSS (i.e. the OBSS AP/STA), the HEW AP may report such a fact to its HEW STA. For this, the HEW AP may transmit an OBSS announcement control frame to HEW STAs belonging to the BSS of the HEW AP.

The following table shows a format of the OBSS announcement control frame. Field names and bit numbers are exemplary purpose only.

TABLE 7

| Frame Control | Duration | RA | TA (BSSID) | FCS |
| --- | --- | --- | --- | --- |
| 2 octets | 2 octets | 2 octets | 2 octets | 2 octets |

The duration field may be set to a value obtained by subtracting a delay time consumed in a channel access process after the HEW AP recognizes OBSS transmission from a transmission time of corresponding OBSS transmission.

The RA field may be set to a broadcast MAC address or individual STA MAC address. If corresponding OBSS transmission is reported to a specific STA in order to continue a channel access mechanism by increasing a CCA sensitivity level, the MAC address of the specific STA may be included in the RA field. Otherwise, if the corresponding OBSS transmission is reported to all STAs belonging to the BSS in order to continue the channel access mechanism by increasing the CCA sensitivity level, the broadcast MAC address may be included in the RA field.

The TA field may set to a BSSID of an HEW AP for transmitting the OBSS announcement control frame.

When the HEW STA receives the OBSS announcement control frame, the HEW STA may determines whether the OBSS announcement control frame is transmitted by an HEW AP associated with the HEW STA by using the TA field. If the BSSID in the TA field is same as a BSSID of the HEW STA, the HEW STA may continue to perform the channel access mechanism by increasing the CCA sensitivity level during an interval indicated by the duration field if the RA field is matched to a MAC address of the HEW STA or broadcast MAC address.

If the AP transmits a MU-MIMO frame, a group ID has a value in the range of 1 to 62. This implies that the MU-MIMO frame does not include the partial AID field. Since the group ID may be set to any value irrespective of a BSS, the group ID cannot be used to identify whether a corresponding frame is transmitted by an AP belonging to the same BSS or an OBSS AP. Accordingly, in case of a MU-MIMO frame, HEW-SIG-A needs to have COLOR 3 bits.

If the HEW AP overhears a frame having a group ID value in the range of 1 to 62, the HEW AP can confirm that the MU-MIMO frame is transmitted from the OBSS AP. Since the HEW AP can determine whether the received frame is transmitted from same BSS or different BSS, the HEW AP can continue to perform the channel access mechanism by increasing the CCA sensitivity level.

If bits for HEW-SIG-A field are not sufficient to define the 3-bit COLOR field, a part of 12-bit $N_{STS}$ field may be set to the 3-bit COLOR field. The $N_{STS}$ field indicates the number of space time streams transmitted to each of up to 4 STAs. For each STA, 3 bits indicate 0 space time streams, 1 space time stream, 2 space time streams, 3 space time streams, and 4 space time streams. However, in order to define the COLOR field, the number of destination STAs of the MU-MIMO frame may be limited to up to 3, and subsequently, last 3 bits of $N_{STS}$ field may be used as the COLOR field. The COLOR indication field may indicate whether the COLOR field is present in the HEW-SIG-A field. When the VHT AP transmits the MU-MIMO frame to the VHT STA, the COLOR indication field value is set to 1, and thus the HEW STA which overhears the MU-MMO frame does not acquire any COLOR information from the $N_{STS}$ field of the MU-MIMO frame. This is because the VHT AP corresponding to the legacy AP allocates the group ID and the $N_{STS}$ to the STA in the conventional way without considering the COLOR value.

Now, a method of managing a Multiple Basic Service Set (BSS) will be described.

A BSS may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

When a virtual AP is configured in a WLAN environment in which a plurality of users operate in a dense area, an STA can be managed more effectively.

The virtual AP is used in a scheme in which several virtual APs are implemented by physically one AP, so that STAs can selectively connect with one of the virtual APs.

For this, the AP may transmit a Beacon frame or Probe response frame having a Multiple BSSID element.

Figure 14:
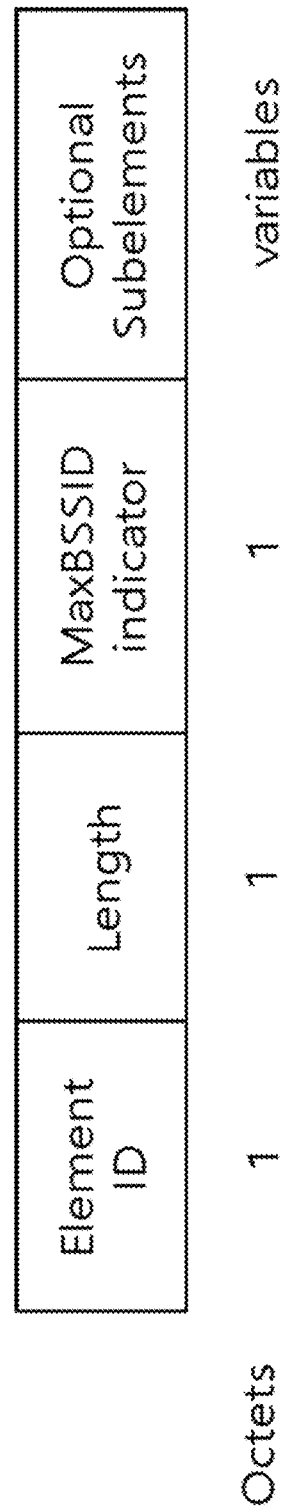
FIG. 14 shows a Multiple BSSID element format according to an embodiment of the present invention.

FIG. 14 shows a Multiple BSSID element format according to an embodiment of the present invention.

The Max BSSID Indicator field contains a value assigned to n, where 2n is the maximum number of BSSIDs in the multiple BSSID set, including the reference BSSID. The actual number of BSSIDs in the multiple BSSID set is not explicitly signaled. The BSSID(i) value corresponding to the i-th BSSID in the multiple BSSID set is derived from a reference BSSID (REF_BSSID) as follows:

$$BSSID(i) = BSSID\_A \text{ OR } BSSID\_B,$$

where:
BSSID_A is a BSSID with (48−n) MSBs equal to the (48−n) MSBs of the REF_BSSID and n LSBs equal to 0,
BSSID_B is a BSSID with (48−n) MSBs equal to 0 and n LSBs equal to [(n LSBs of REF_BSSID)+i] mod 2n.

Through the Max BSSID indicator, the maximum number of supportable virtual APs and BSSID(i) connected to each virtual AP can be calculated.

FIG. 15 shows a Multiple BSSID index element format according to an embodiment of the present invention.

A Beacon frame or a Probe Response frame may include the Multiple BSSID index element in addition to a Multiple BSSID element. The Multiple BSSID index element configures a DTIM Period and a DTIM Count for each virtual AP. If the Multiple BSSID index element is included in the Probe Response frame, the DTIM Period and the DTIM Count may be omitted.

The BSSID Index field is a value between 1 and $2^n-1$ that identifies the non-transmitted BSSID, where n is a nonzero, positive integer value.

The DTIM Period field is the DTIM period field for the BSSID. This field is not present when the Multiple BSSID-Index element is included in the Probe Response frame.

The DTIM Count field is the DTIM count field for the BSSID. This field is not present when the Multiple BSSID-Index element is included in the Probe Response frame.

Another feature of the virtual AP is that an Association ID (AID) of an STA connected to each virtual AP and a Traffic Indication Map (TIM) are delivered through a single information element. That is, this implies that different values are allocated to STAs A and B connected to BSSIDs 1 and 2. Although being connected to APs each having a different BSSID, the STAs are connected to a physically single AP. The single AP internally manages the STAs, and thus AID ranges for the STAs are selected in the common range.

An STA which acknowledges that a virtual AP is supported through the Multiple BSSID element and the Multiple BSSID index element calculates a BSSID(i) (i.e., BSSID(i)=BSSID_A OR BSSID_B) of the virtual AP to which the STA intends to connect, and thereafter performs a management access and data transmission/reception procedure by using the calculated BSSID(i).

When a requesting STA transmits an Association Request frame that includes address fields, for example, a Receiver Address (RA) (Address1 field) and a Transmitter Address (TA) (Address2 field), the BSSID(i) value is set to the RA (Address1 field) and the requesting STA's MAC address value is set to the TA (Address2 field). A virtual AP which receives the Association Request frame responds with an Association Response frame to the requesting STA. The Association Response frame may include information about an AID allocated to the requesting STA.

In order to set an AID as non-zero, the AID may be allocated to the STA in such a manner that the following equation:

$$(\text{dec}(AID[0:8]) + \text{dec}(BSSID[44:47] \text{ XOR } BSSID[40:43]) \times 2^5) \bmod 2^9 \quad \text{.[Equation 7]}$$

The Partial AID is included in a PLCP header and used to identify an intended STA. If a Partial AID of a PPDU currently being received is not identical to a Partial AID of the STA, the STA may no longer decode the PPDU but may discard the PPDU.

A partial AID of a Multicast/Broadcast frame or a frame transmitted from an unassociated STA is set to 0 for a special purpose. A filtering procedure is not performed on a PPDU of which a Partial AID value is 0. Therefore, in order to decrease unnecessary overhearing of the STA, an AID obtained from the proposed equation 7 should be a non-zero.

An STA which supports a virtual AP may calculate a BSSID(i) of a virtual AP to which the STA intends to have a connection, and delivers this implicitly to the virtual AP through an Association Request frame (e.g., an RA (Address1 field)). The virtual AP which receives the Association Request frame may allocate an AID to the STA by using an BSSID(i) value acquired from the Association Request frame such that a Partial AID value obtained by the following equation is non-zero.

$$(\text{dec}(AID[0:8]) + \text{dec}(BSSID(i)[44:47] \text{ XOR } BSSID(i)[40:43]) \times 2^5) \bmod 2^9 \quad \text{.[Equation 8]}$$

It may be assumed that a Partial AID value is 0 when an AID 100 is assigned to an STA linked to a BSSID(1), and the Partial AID value is 0 when an AID 101 is assigned to an STA linked to a BSSID(2). In this case, not the AID 100 but the AID 101 is preferably assigned to the STA which has a connection to the virtual AP of the BSSID(1), and not the AID 101 but the AID 100 is preferably assigned to the STA which has a connection to the virtual AP of the BSSID(2).

In case of a downlink unicast frame, the partial AID cannot be reused with the COLOR bits, and thus the HEW-SIGA needs to have the COLOR field.

A COLOR value of a BSS may be delivered to a HEW STA through a Beacon frame, a Probe Response frame, and a (Re)-Association response frame. Alternatively, after the HEW STA overhears any frame belonging to the BSS, it may be estimated as a value of a COLOR field included in an HEW-SIGA of the overheard frame. When the COLOR value of the BSS is known, the HEW STA may set the same COLOR value to an HEW-SIGA for a frame to be transmitted to a peer STA belonging to the BSS. When a HEW STA does not know a COLOR value of a BSS, the HEW STA is only allowed to transmit a legacy PPDU. If a follow-up frame is to be transmitted in a HEW PPDU, the proceeding PPDU should include the COLOR value of the BSS. For example, a frame eliciting a HEW PPDU transmission may have a COLOR value of a BSS.

In a virtual AP environment, all COLOR fields for virtual APs may be set to the same value. The virtual AP corresponds to physically a single AP. This is because simultaneous transmission/reception for different virtual APs is not possible while one of the virtual APs performs transmission/reception. For example, it is assumed that an STA1 and an STA2 are connected respectively to a first virtual AP having a BSSID1 and a second virtual AP having a BSSID2. PPDU1 transmitted by the STA1 and PPDU2 transmitted by the STA2 may have the same COLOR value. PPDU3 transmitted by the first virtual AP and PPDU4 transmitted by the second virtual AP may also have the same COLOR value. This is because, even if the virtual APs have different COLOR values, STAs do not know whether the COLOR values is sent from different virtual APs. For example, the STA1 cannot know whether the COLOR value is sent from the first virtual AP. Thus STA1 cannot distinguish the received COLOR value which is sent from the first virtual AP or from the second virtual AP.

Now, a method related to a PPDU transmission and an error recovery during a transmission opportunity (TXOP) is described.

A TXOP may be defined as an interval of time during which a STA has the right to initiate frame exchange sequences onto a wireless medium. An access category (AC) may be defined as a label for the common set of enhanced distributed channel access (EDCA) parameters that are used by a station to contend for the channel in order to transmit medium access control (MAC) service data units (MSDUs) with certain priorities. The AC relates to quality-of-service (QoS) requirements.

If a STA transmits one or more PPDUs simultaneously to a plurality of destination STAs by independently dividing it for each channel, this may be called as an OFDMA mode. While operating in the OFDMA mode, the STA can send one or more PPDUs to the plurality of destination STAs via plurality of channels as shown in FIGS. 8 and 9.

A subchannel may refer to a transmission unit allocated to each transmitter STA in the OFDMA mode. An operating bandwidth can be divided into a plurality of subchannels.

If a transmitter STA transmits an HEW PPDU simultaneously to a plurality of destination STAs by independently dividing it for each channel, the HEW PPDU to be transmitted to each destination STA must have the same Access Category. In FIG. 9, a PPDU transmitted by an STA1 to an STA2 and a PPDU transmitted by the STA1 to an STA3 must have the same Access Category.

A TXOP Limit is set differently depending on an Access Category of the TXOP. Therefore, this implies that the same TXOP Limit value must be applied to all PPDUs to be transmitted, if the transmitter STA transmits the HEW PPDU simultaneously to the plurality of destination STAs by dividing it for each channel. For this, a Primary Access Category is proposed.

The Primary Access Category may indicate an Access Category of a Back-off timer used by an STA to acquire a TXOP. In FIG. 9, a Back-off timer is running for each Access Category before an STA1 transmits an RTS frame, and if a Back-off timer corresponding to Access Category Voice (AC_VO) reaches 0 among the Back-off timers, the AC_V0 corresponds to the Primary Access Category. If the Primary Access Category is determined, the HEW PPDU with the Primary Access Category can only be transmitted.

Since each of the plurality of destination STAs has a different amount of data to be received, HEW PPDUs of different Access Categories can be simultaneously transmitted by independently dividing it for each channel according to another embodiment of the present invention. However, in this case, a TXOP Limit of the corresponding TXOP must be determined by the Primary Access Category. In FIG. 9, when the Primary Access Category is the AC_VO, an Access Category of a PPDU transmitted by the STA1 to the STA2 must be the AC_VO, and the entire TXOP is restricted to the TXOP Limit of the AC_VO. An Access Category of a PPDU transmitted by the STA1 to the STA3 may be AC_VI (Video), AC_BE (Best Effort) or AC_BK (Background).

If an available bandwidth of a destination STA is wider than a transmission bandwidth of a transmitter STA which acquires a TXOP, the destination STA may support simultaneous transmission performed by another STA by independently dividing it for each channel, in addition to the transmitter STA.

The transmitter STA which has acquired the TXOP through the Back-off mechanism transmits an RTS frame to the destination STA. The bandwidth signal and Access Category may be included in the RTS frame. On the basis of the bandwidth and Access Category included in the RTS frame, the destination STA may allow another STA to transmit a data frame for the destination STA. During the TXOP of the transmitter STA, a channel not used by the transmitter STA is allowed to be used by another STA. A destination STA can transmits at least one CTS frames via at least one idle subchannel. For example, the destination STA may send a first CTS frame via a first subchannel to the transmitter STA and may send a second CTS frame via a second subchannel to another STA. The transmitter STA which has received the first CTS frame can transmit a data frame to the destination STA by utilizing only the first subchannel which receives the first CTS frame. The destination STA can also utilize the second subchannel to communicate with another STA.

Figure 16:
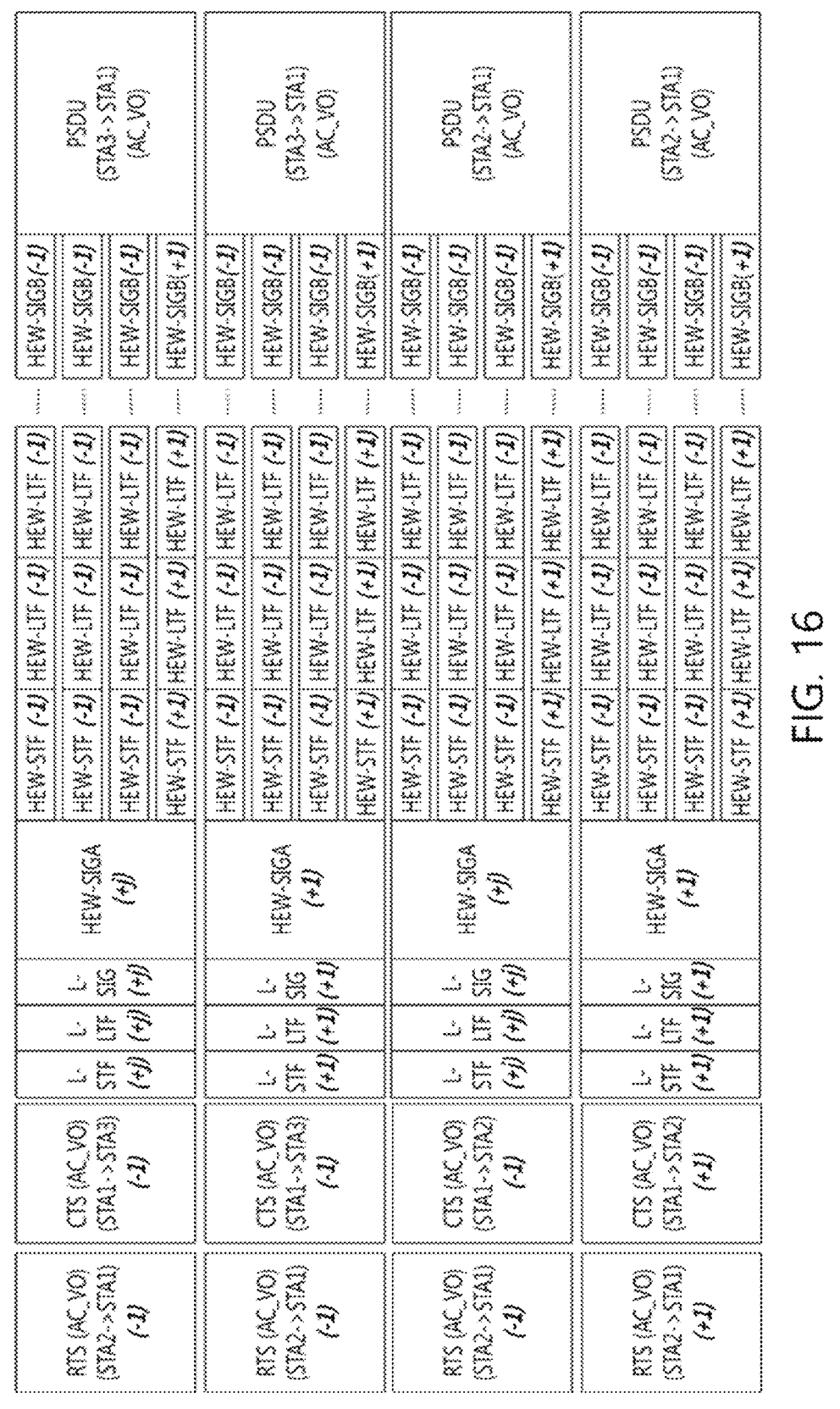

FIG. 16 shows an example of PPDU transmission having an RTS/CTS bandwidth signal.

Before transmitting an HEW PPDU, a transmitter STA, i.e., an STA2, transmits an RTS frame to one destination STA, i.e., an STA1, and receives a CTS frame as a response from the STA1. The STA2 performs Clear Channel Assessment (CCA). The STA2 determines that an 80 MHz channel is idle, transmits the RTS frame through the 80 MHz channel in unit of 20 MHz channel in a duplicated manner. In order to decrease a PAPR, a phase rotation sequence of {+1, −1, −1, −1} is multiplied over four 20 MHz channels.

In a case where the destination STA, i.e., the STA1, intends to support simultaneous transmission of an HEW PPDU by a plurality of transmitter STAs by independently dividing it for each channel, a CTS frame may be transmitted to different transmitter STAs for each channel as a response. In FIG. 16, it can be seen that the STA1 responds with the CTS frame to the STA2, and at the same time, STA1 sends a CTS frame to an STA3 in a different channel. Although the CTS frame is simultaneously transmitted by being independently divided for each channel with respect to different transmitter STAs, it can be seen that transmission is performed by multiplying four 20 MHz channels by a phase rotation sequence of {+1, −1, −1, −1}.

The STA2 and STA3 can receive the CTS frames from the STA1 respectively. Respective CTS frame has information about its transmission channel and an Access Category. STA2 and STA3 can send HEW PPDUs to the STA1 via transmission channels in which corresponding CTS frames are received.

The HEW PPDUs may have same Access Category. In FIG. 16, a HEW PPDU1 transmitted by the STA2 to the STA1 and a HEW PPDU2 transmitted by the STA3 to the STA1 may have the same Access Category. A TXOP Limit is set differently depending on an Access Category of the TXOP. Therefore, same TXOP Limit can be applied to all HEW PPDUs to be transmitted. For this, the aforementioned Primary Access Category may be defined.

The Primary Access Category indicates an Access Category of a Back-off timer used by a STA to acquire the TXOP. In FIG. 16, a Back-off timer is running for each Access Category before an STA1 transmits an RTS frame. If a Back-off timer corresponding to Access Category Voice (AC_VO) reaches 0, the AC_V0 corresponds to the Primary Access Category. If the Primary Access Category is determined, information about the Primary Access Category can be sent to a destination STA. The destination STA can deliver the Primary Access Category information to the plurality of transmitter STAs. Accordingly, all PPDUs to be transmitted by the plurality of transmitter STAs can have same Access Category.

Since the plurality of transmitter STAs have a different amount of data to transmit, HEW PPDUs of different Access Categories can be simultaneously transmitted by independently dividing it for each channel according to another embodiment of the present invention. However, in this case, a TXOP Limit of the corresponding TXOP must be determined by the Primary Access Category. In FIG. 16, when the Primary Access Category is the AC_VO, an Access Category of a PPDU transmitted by the STA1 to the STA2 must be the AC_VO, and the entire TXOP is restricted by the TXOP Limit of the AC_VO. An Access Category of a PPDU transmitted by the STA1 to the STA3 may be AC_VI (Video), AC_BE (Best Effort) or AC_BK (Background).

To deliver information about the Primary Access Category to STAs through an RTS/CTS frame, it is proposed to encode at least one bit of the scrambling sequence with a QoS parameter such as AC_VO, AC_VI, AC_BE, AC_BK.

Figure 17:
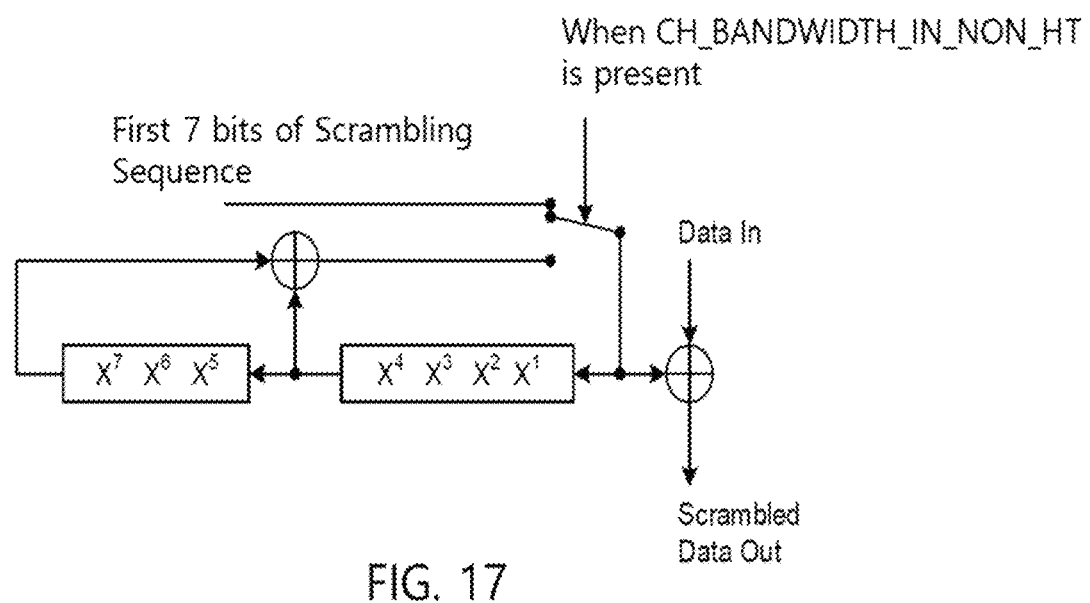
FIG. 17 shows a scrambling procedure for a data field in a PPDU.

FIG. 17 shows a scrambling procedure for a data field in a PPDU.

A data field in a PPDU may be scrambled with a length-127 frame-synchronous scrambler. The data field includes at least one PDSU. The octets of the PSDU are placed in the transmit serial bit stream, bit 0 first and bit 7 last. The 127-bit sequence generated repeatedly by the scrambler shall be (leftmost used first), 00001110 11110010 11001001 00000010 00100110 00101110 10110110 00001100 11010100 11100111 10110100 00101010 11111010 01010001 10111000 1111111. The same scrambler is used to scramble transmit data and to descramble receive data. If the parameter CH_BANDWIDTH_IN_NON_HT is not present, the initial state of the scrambler may be set to a pseudo-random nonzero state. If the parameter CH_BANDWIDTH_IN_NON_HT is present, the first 7 bits of the scrambling sequence may be set as shown in following table.

TABLE 8

| First 7 bits of Scrambling Sequence | | | | | | |
|---|---|---|---|---|---|---|
| B0 | B1 | B2 | B3 | B4 | B5 | B6 |
| Primary Access Category | | | | | CH_BANDWIDTH_IN_NON_HT | |

Since the first 7 bits of the scrambling sequence are used as a scrambling initial seed, at least 2 bits may be set to a value indicating the Primary Access Category.

When a Primary Access Category of a corresponding TXOP is known through an RTS frame, a destination STA can respond with a CTS frame by setting the Primary Access Category to the same value.

Figure 18:
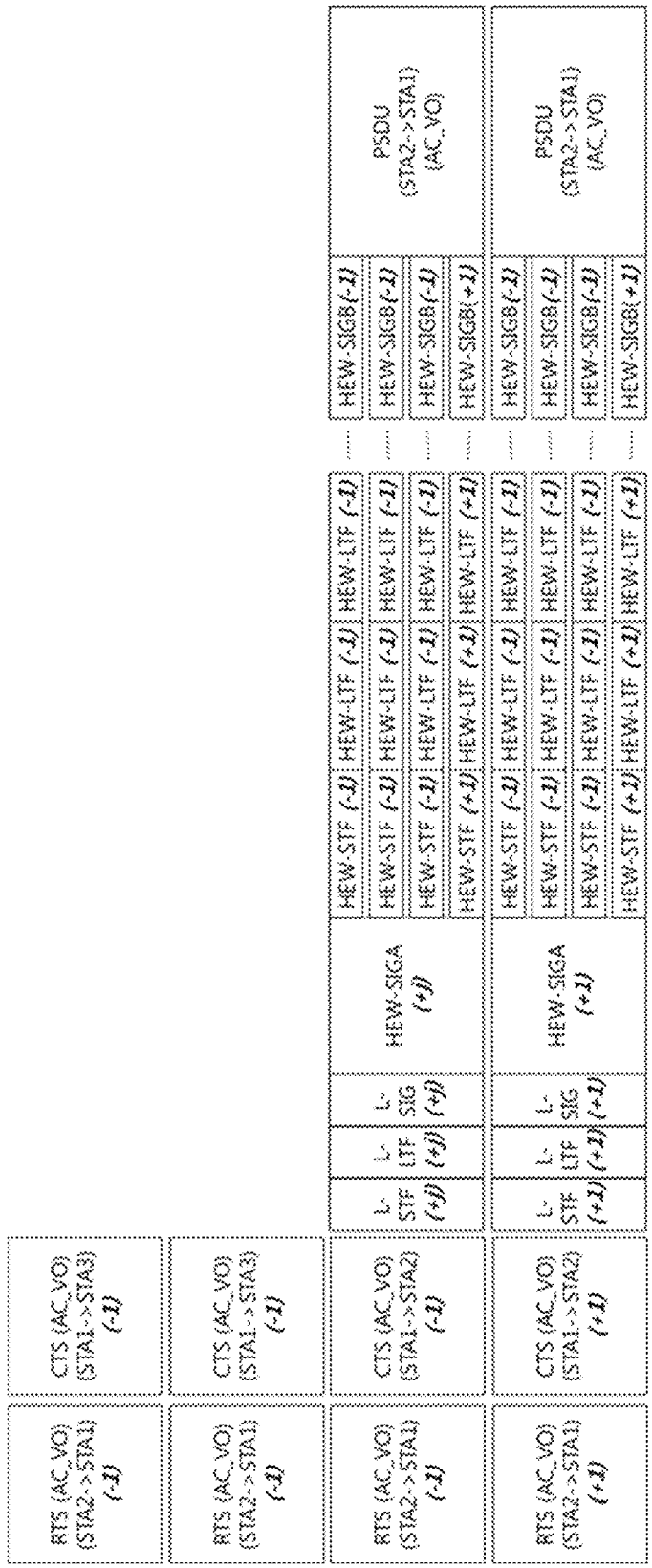
FIG. 18 shows an example of HEW PPDU transmission having an RTS/CTS bandwidth signal.

FIG. 18 shows an example of HEW PPDU transmission having an RTS/CTS bandwidth signal.

This is a case where an STA1 responds with a CTS frame to an STA2 and an STA3, but the STA3 fails to successfully receive the CTS frame. The STA2 acquires the TXOP and the STA1 is the destination STA.

If the STA3 fails to successfully receive the CTS frame, the STA3 does not transmit a data frame to the STA1. As such, if an error occurs in the middle of TXOP, the data frame is not transmitted in a channel allocated to the STA3. In order to utilize the channel not used by the STA3, the STA1 and the STA2 may perform a PCF Interframe Space (PIFS) recovery procedure on all of a primary channel and secondary channels to determine again a channel bandwidth to be used at a later time.

Figure 19:
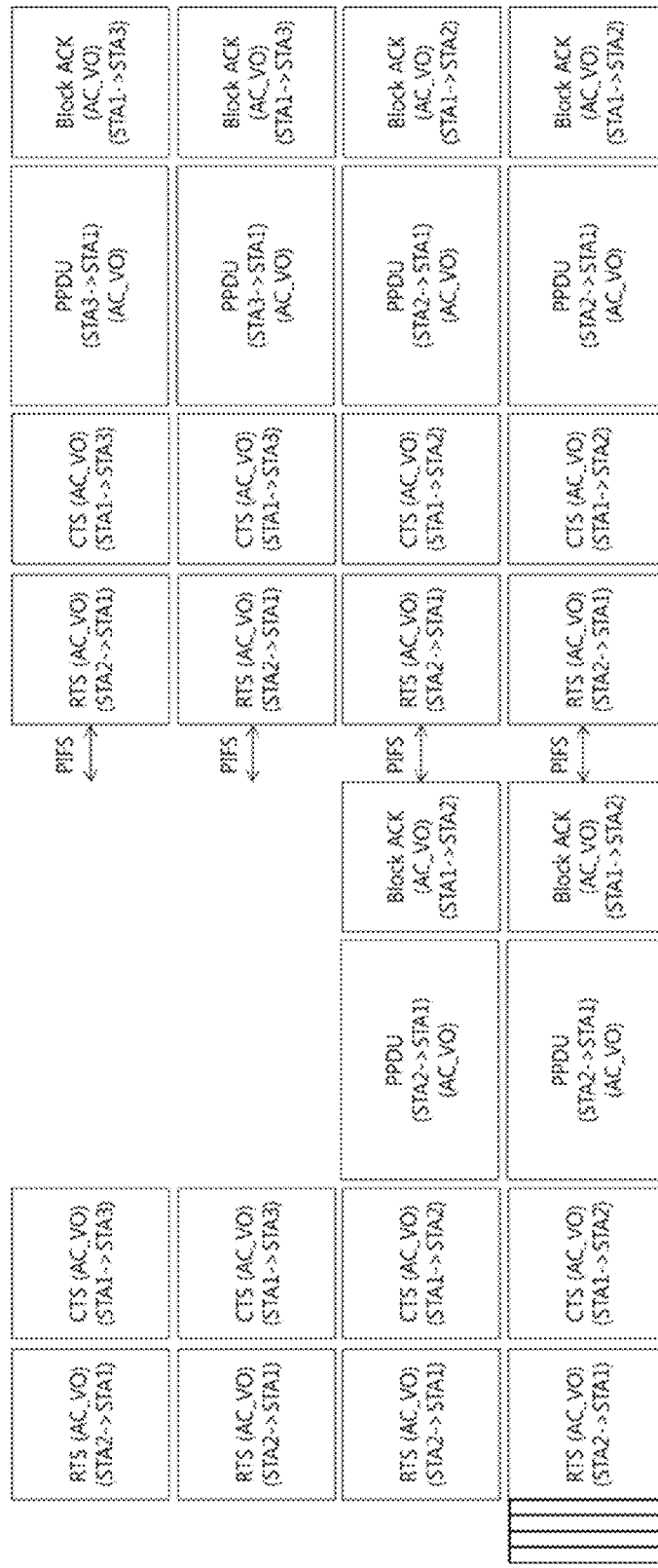
FIG. 19 shows a PIFS Recovery procedure performed after a frame error occurs in the middle of TXOP.

FIG. 19 shows a PIFS Recovery procedure performed after a frame error occurs in the middle of TXOP.

An STA2 acquires TXOP through a Back-off timer of an AC_VO, and subsequently transmits an RTS frame to an STA1. The STA1 responds with a CTS frame to the STA2 and an STA3 by using different channels. The STA2 which has successfully received the CTS frame transmits a PPDU to the STA1 by using a bandwidth signal included in the CTS frame and a channel through which the CTS frame is received. Further, a Block ACK frame is received from the STA1 as a response, and a feedback for data frame transmission is received.

However, the STA3 which fails to successfully receive the CTS frame does not transmit any PPDU to the STA1.

The STA1 which cannot receive any data frame from the STA3 requests the STA2, i.e., a TXOP owner, to perform a PIFS Recovery for the purpose of re-allocating to another STA a channel allocated to the STA3 Such a request may be signaled through a Block ACK frame transmitted by the STA1 to the STA2. The STA2 which receives a request for performing the PIFS Recovery from the STA1 may determine whether a channel state is an idle/busy state by performing a CCA process during a PIFS time with respect to a primary channel and secondary channels.

If the STA1 has a right of the TXOP owner (e.g., the STA1 is a RD responder in reverse direction protocol), the STA1 may perform the CCA process during a PIFS time with respect to a primary channel and secondary channels. It means that a STA operating in the OFDMA mode performs the PIFS Recovery for the purpose of re-allocating a channel during a TXOP, irrespective of the success of the transmitted HEW PPDU.

In FIG. 19, all 80 MHz channels are idle, and the STA2 transmits again an RTS frame in the 80 MHz channel. A destination STA, i.e., the STA1, responds with a CTS frame to the STA2 and the STA3 through respective different channels, and thus provides the STA3 an opportunity of simultaneously transmitting an HEW PPDU independently in a corresponding channel one more time. In this time, the STA3 which has successfully received the CTS frame also transmits a PPDU to the STA1 by using a bandwidth signal included in the CTS frame and a channel through which a CTS frame is received. Further, a Block ACK frame is received from the STA1 as a response, and a feedback for data frame transmission is received.

Figure 20:
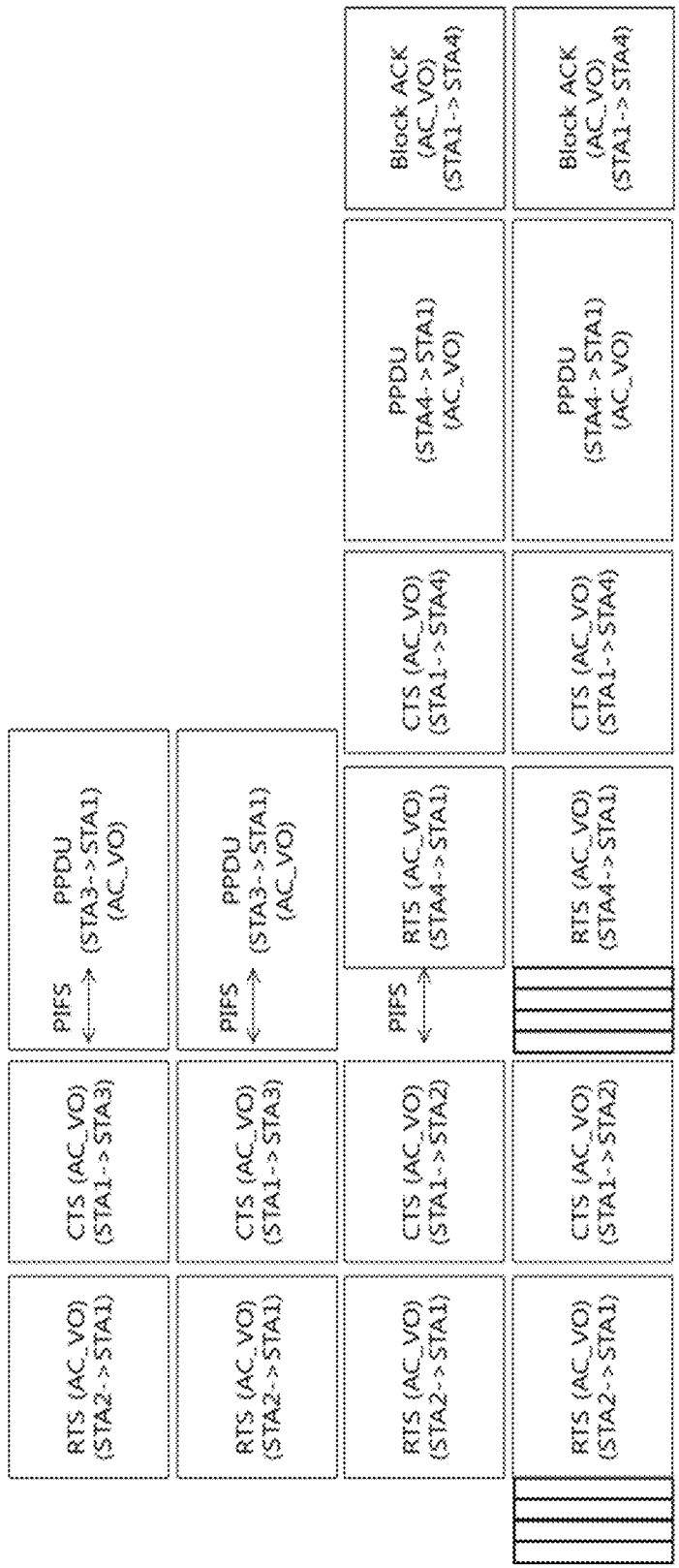
FIG. 20 shows a Recovery procedure when a frame error occurs.

FIG. 20 shows a Recovery procedure when a frame error occurs.

An STA2 acquires TXOP through a Back-off timer of an AC_VO, and subsequently transmits RTS frames to an STA1. The STA1 responds with CTS frames to the STA2 and an STA3 by using different channels.

The STA3 which has successfully received the CTS frame transmits a PPDU to the STA1 by using a bandwidth signal included in the CTS frame and a channel through which the CTS frame is received.

However, the STA2 which fails to successfully receive the CTS frame does not transmit any PPDU to the STA1. Since the STA2 corresponding to a TXOP owner does not use a primary channel, all STAs including the STA2 perform a Back-off mechanism again, and in the above figure, an STA4 can newly obtain TXOP and transmit RTS frames to the STA1. However, since the STA3 is currently transmitting a 40 MHz PPDU, a corresponding channel state is busy, and thus the RTS frames of the STA4 can be transmitted only through a 40 MHz channel including a primary channel. This is a case where the STA1 receives PPDUs from the STA2 and also receives the RTS frames from the STA4.

In an embodiment, a STA can stop receiving of a frame which is currently being received in secondary channels when a certain frame is received in its primary channel while another frame is received in the secondary channels. A capture effect is a scheme of immediately stopping receiving of a frame currently being received upon receiving of a signal having strength greater by a specific level than or equal to received signal strength of a frame currently being received in the same channel. The proposed method extends such a concept of the capture effect, which means that receiving of a certain frame is immediately stop irrespective of reception signal strength of a frame currently being received in secondary channels, when the certain frame is received in its primary channel during the certain frame is received in the secondary channels.

In FIG. 20, the STA1 which has successfully received an RTS frame from the STA4 responds with a CTS frame to the STA3, and subsequently, the STA4 starts to transmit a PPDU to the STA1.

Figure 21:
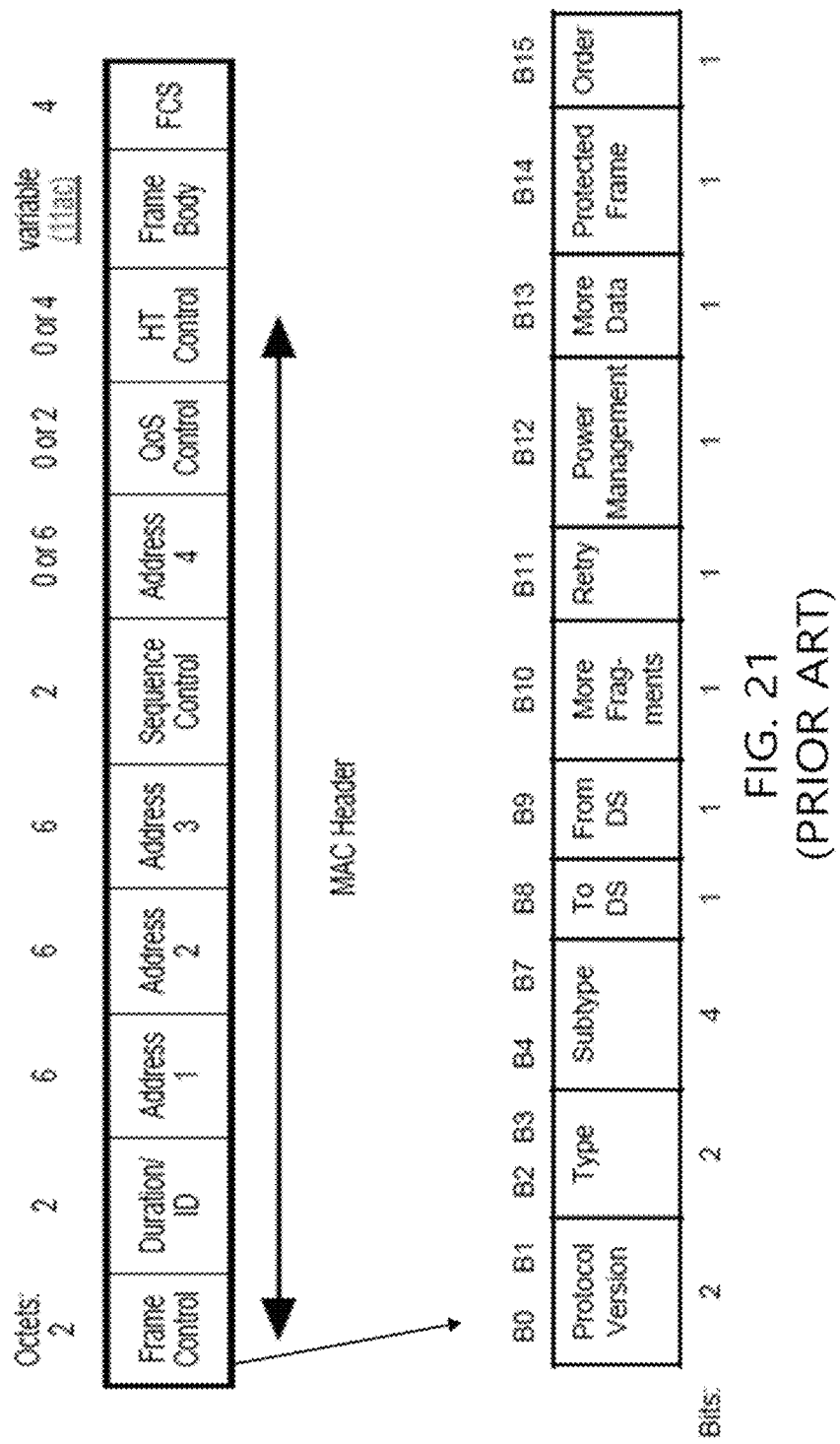
FIG. 21 shows an example of a Medium Access Control (MAC) frame format based on the conventional IEEE 802.11.

FIG. 21 shows an example of a Medium Access Control (MAC) frame format based on the conventional IEEE 802.11.

This frame corresponds to a Protocol Version 0 (PV0) Data frame. The PV0 Data frame includes Frame Control, Duration/ID, Address 1 (Receiver Address), Address 2 (Transmitter Address), Address 3 (BSSID), Sequence Control, Address 4, Quality-of-Service (QoS) Control, HT Control, MSDU, and Frame Control Sequence (FCS).

The Frame Control field includes Protocol Version, Type, Subtype, To DS, From DS, More Fragment, Retry, Power Management, More Data, Protected Frame, and Order.

The Protocol Version may be set to 0 to indicate that a corresponding MAC Protocol Data Unit (MPDU) is a PV0 Data frame. The Type and the Subtype are set to indicate that a corresponding MPDU is a DATA frame, and to specify a detailed type such as QoS data and null data among the Data frames. The To DS indicates whether it is transmitted to a distribution system, and the From DS indicates whether it is transmitted from the distribution system.

Figure 22:
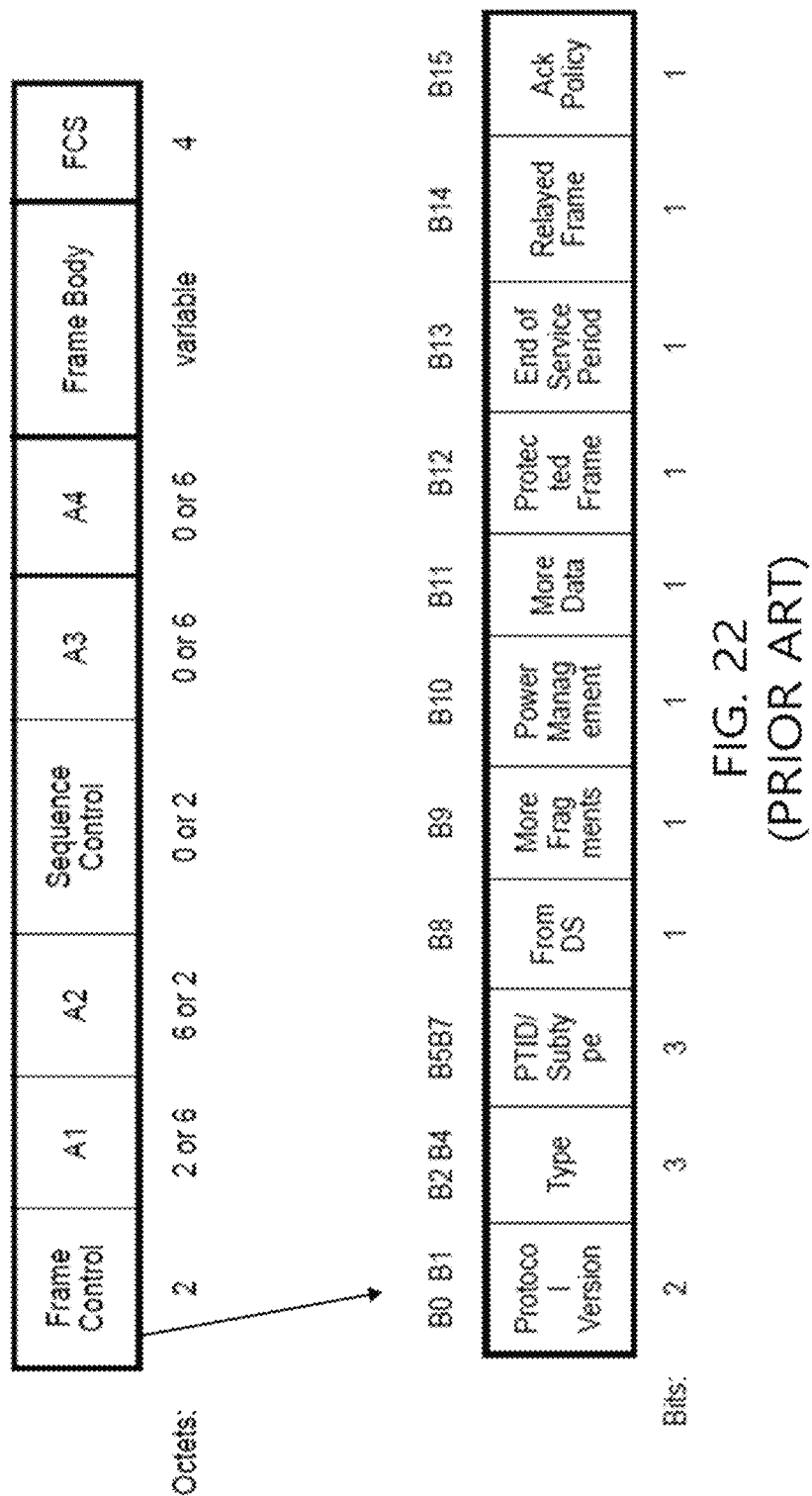
FIG. 22 shows another example of a MAC frame format based on the conventional IEEE 802.11.

FIG. 22 shows another example of a MAC frame format based on the conventional IEEE 802.11.

This frame corresponds to a Protocol Version 1 (PV1) Data frame. The PV1 Data frame includes Frame Control, Address 1 (Receiver Address), Address 2 (Transmitter Address), Sequence Control, Address 3, Address 4, MSDU, and FCS.

The Frame Control field of the PV1 Data frame includes Protocol Version, Type, PTID/Subtype, From DS, More Fragment, Power Management, More Data, Protected Frame, End of Service Period, Relayed Frame, and Ack Policy.

The Protocol Version may be set to 1 to indicate that a corresponding MPDU is a PV1 Data frame. The Type and the PTID/Subtype are set to indicate that a corresponding MPDU is a DATA frame, and to specify a detailed type such as QoS data and null data among the Data frames. The From DS indicates whether it is transmitted from a distribution system. According to the From DS field, contents of Address 1 and Address 2 are determined.

Table 9 shows contents included in Address 1, Address 2, Address 3, and Address 4 according to the From DS.

TABLE 9

| From DS field | Meaning | Use |
|---|---|---|
| 0 | A1 contains the MAC address of the receiver. A2 is an Short ID (2 octets) which contains the AID of the transmitter. A3 (if present) contains the MAC address of the destination. A4 (if present) contains the MAC address of the source. | For frames transmitted by a non-AP STA to an AP. For frames transmitted from a non-AP STA to non-AP STA (direct link) |
| 1 | A1 is an SID (2 octets) which contains the AID of the receiver. A2 is the MAC address of the transmitter. A3 (if present) contains the MAC address of the destination. A4 (if present) contains the MAC address of the source. | AP to non-AP STA |

Comparing the PV0 Data frame and the PV1 Data frame, the PV1 Data frame is different from the PV0 Data frame in a sense that fields considered as being unnecessary, for example, duration/ID and QoS, are excluded from a MAC header. Therefore, the PV1 Data frame may be called a short data frame. If a size of an MSDU is great, the PV0 data frame is preferably used, and if the size of the MSDU is small, the PV1 data frame is preferably used to decrease an overhead for the MAC header.

Figure 23:
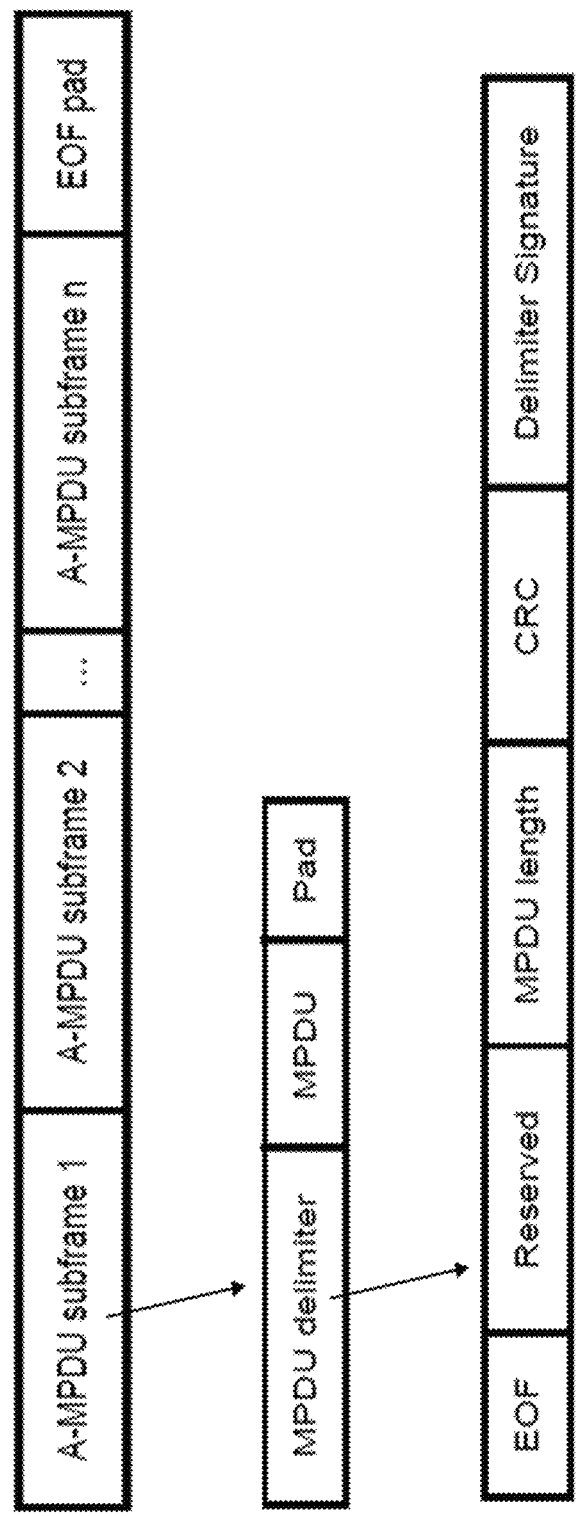
FIG. 23 shows an A-MPDU format according to an aggregation scheme for an MPDU.

FIG. 23 shows an A-MPDU format according to an aggregation scheme for an MPDU.

Each of a plurality of MPDUs is configured with an aggregated-MPDU (A-MPDU) subframe and is transmitted by being aggregated with one PPDU.

The A-MPDU subframe includes a 4-octet MPDU delimiter, a MPDU, and a Pad octet.

The MPDU delimiter includes EOF, MPDU length, CRC, and Delimiter Signature.

As an HEW MAC format, it is proposed an aggregation scheme for different types of MPDUs, i.e., a PV0 Data frame and a PV1 Data frame.

Figure 24:
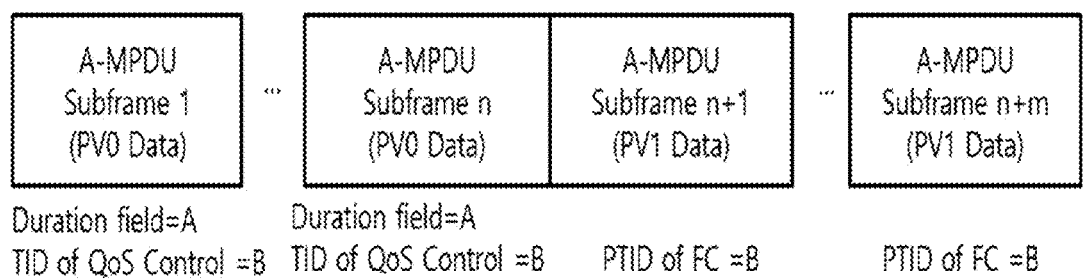
FIG. 24 shows a frame format according to an embodiment of the present invention.

FIG. 24 shows a frame format according to an embodiment of the present invention.

PV0 and PV1 Data frames are aggregated within one A-MPDU frame.

When aggregating the PV0 and PV1 Data frames, there is a need to distinguish the PV0 Data frame and the PV1 Data frame in order to decrease decoding complexity of a receiver STA. It is not preferable to aggregate the frames in a mixed manner such as the PV0 Data frame, the PV1 Data frame, the PV0 Data frame, and the PV1 Data frame.

The PV0 Data frame and the PV1 Data frame may be aggregated sequentially. This means that the PV1 Data frame is included in an A-MPDU subframe only after the PV0 Data frame. Since more pieces of information are included in the PV0 Data frame, a load of decoding processing may be decreased.

In order to aggregate the PV0 and PV1 Data frames, there are several restrictions as follows.

First, as shown in FIG. 24, a Traffic Identifier (TID) value may be identical for both of a PV0 Data frame and a PV1 Data frame to be aggregated. The PV0 Data frame is encoded through a TID subfield (4 bits) of a QoS control field of a MAC header, and the PV1 Data frame is encoded through a PTID subfield (3 bits) of a Frame Control (FC)

field of the MAC header. The PTID implies a Partial TID, and implies lower 3 bits among 4 bits of a TID subfield of a QoS control field. It is shown in FIG. 8 that TID and PTID subfields of the PV0 Data frame and PV1 Data frame included in the A-MPDU have the same Traffic Identifier (TID) value of 'B'.

Second, the Address 1 and the Address 2 may indicate the same STA. In case of the PV0 Data frame, the Address 1 includes a receiver STA MAC address, and the Address 2 includes a transmitter STA MAC address. However, in case of the PV1 Data frame, although the Address 1 indicates the receiver STA and the Address 2 indicates the transmitter STA in the same manner as described above, a short ID value including an AID is used as one of the Address 1 and the Address 2 according to the From DS subfield of the Frame Control field.

This implies that the receiver STA indicated by the Address 1 with respect to the PV0 Data frame and the PV1 Data frame may be identical even though contents of the Address 1 are different from each other with respect to the PV0 Data frame and the PV1 Data frame. Also, this implies that the transmitter STA indicated by the Address 2 with respect to the PV0 Data frame and the PV1 Data frame may be identical even though contents of the Address 2 are different from each other with respect to the PV0 Data frame and the PV1 Data frame.

Third, sequence number values of Sequence Control fields for the PV0 Data frame and the PV1 Data frame may be managed as one counter. This implies that the PV0 Data frame with SN1 and the PV1 Data frame with SN2 cannot be aggregated together in the same A-MDPU. In other words, this implies that, if the PV0 Data frame uses the counter of the SN1, the PV1 Data frame is also managed sequentially by using the same counter, i.e., SN1, so that the frames can be aggregated together in the same A-MDPU. This is because an STA which has received a corresponding A-MPDU assumes that a sequence number of MPDUs included in the A-MPDU is sequentially increased when transmitting an acknowledgement through Block ACK.

Fourth, all Duration fields of PV0 Data frames constituting the A-MPDU subframe may be identical. The Duration field is set for the purpose of protecting a TXOP duration or a Response PPDU to be transmitted after a corresponding A-MPDU. Other STA does not access the channel during an interval indicated by the Duration field. In case of the PV1 Data frame, the Duration field may not be included in a MAC header. A Duration field value in the PV0 Data frame may also indicate a Duration field value of the PV1 data frame when the PV1 Data frame is aggregated with the PV1 Data frame in the A-MPDU frame.

Fifth, for the PV0 Data frame and PV1 Data frame constituting the A-MPDU subframe, among Ack Policy fields of corresponding frames, the number of "Normal Ack or Implicit Block Ack requests", i.e., A-MPDU subframes for requesting an immediate control response, may not be equal to or greater than 2. This is because a collision occurs in a plurality of immediate control responses in this case.

If there is no PV0 Data frame to be transmitted, only the PV1 Data frame may be included in an A-MPDU subframe of an A-MPDU frame. In this case, a TXOP Duration or a Response PPDU to be transmitted at a later time cannot be protected. This is because the Duration field does not exist in the MAC header of the PV1 Data frame. In this case, the following PV0 Null Data frame can be used.

Figure 25:
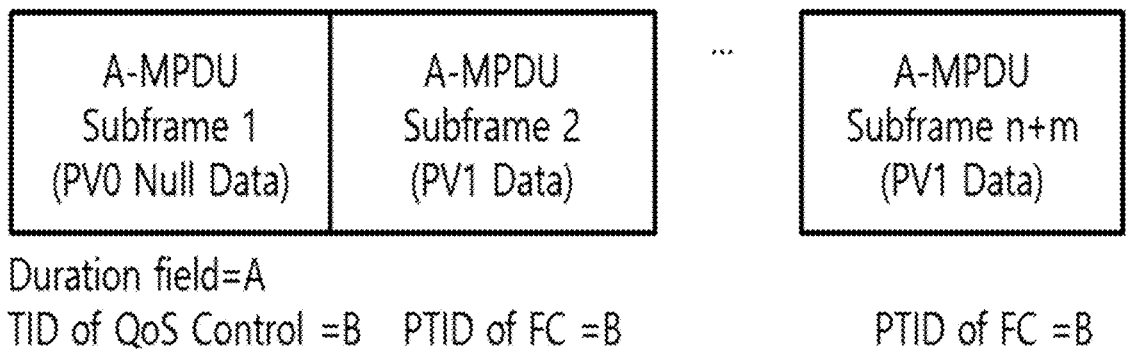
FIG. 25 shows an A-MPDU format having a PV0 Null Data frame.

FIG. 25 shows an A-MPDU format having a PV0 Null Data frame.

A PV0 Null Data frame may include an MPDU not having an MSDU. The PV0 Null Data frame may be used to protect a TXOP Duration or a Response PPDU to be transmitted at a later time through a duration field of a MAC header.

If only the PV1 Data frame is included as an A-MPDU subframe of the A-MPDU frame or if the PV1 Data frame is transmitted as a single PPDU, there is still a problem in that the TXOP Duration or the Response PPDU to be transmitted at a later time cannot be protected.

As a solution for this, a Response Indication field may be included in a PLCP Header of a corresponding PPDU, for example, in a signal field. The signal field may be included in a physical layer preamble of a PPDU. For example, the Response Indication field may be in included in L-SIG, HEW-SIGA or HEW-SIGB of an HEW PPDU.

The Response Indication field may indicate a type of an expected response used to protect the response frame. The Response Indication field may indicate a type of a Response PPDU to be transmitted after the corresponding PPDU transmitted at the moment.

The Response Indication field may be set to a value indicating one of No Response, Normal Response and Long Response. The No Response indicates no immediate response that implies that there is no Response PPDU to be transmitted after the corresponding PPDU. The Normal Response indicates that an addressed recipient returns an individual control response frame. The Normal Response may imply that a control response PPDU such as ACK or Block ACK is to be transmitted starting one Short Interframe Space (SIFS) after the end of the corresponding PPDU. The Long Response indicates that an addressed recipient may return a response frame which is not an individual control response frame. The Long Response may imply that a response PPDU such as a normal DATA PPDU other than ACK and the Block ACK is to be transmitted starting one SIFS after the end of the corresponding PPDU.

Hereinafter, it is proposed a channel access scheme when a plurality of STAs operate in a Power Save (PS) mode under dense WLAN environments.

A STA operating in the PS mode transitions between an awake state and a doze state. In the awake state, the STA is fully powered. In the doze state, the STA is not able to transmit or receive and consumes very low power. When operating in the PS mode, the STA listens to selected Beacon frames and sends PS-Poll frames to the AP if the TIM element in the most recent Beacon frame indicates an individually addressed bufferable unit (BU) is buffered for that STA. The AP transmits buffered individually addressed BUs to the STA only in response to the PS-Poll frame. The STA in the doze state may enter the awake state to receive selected Beacon frames.

An operation of an HEW STA operating in a PS mode is as follows. An STA which has transitioned from a doze state to an awake state for frame transmission may perform a CCA process until: 1) a Network Allocation Vector (NAV) of the STA is correctly set by detecting a sequence for a certain frame; or 2) a duration corresponding to ProbeDelay elapses.

However, with the use of techniques such as Beamforming, Multi-channel, MIMO, and OFDMA, it has become more difficult to set an NAV by correctly receiving a Duration field in a MAC header of an MPDU. Therefore, it is proposed to perform the CCA process by the HEW STA transitioned from the Doze state to the Awake state until at least one of the following condition is satisfied:

1) a sequence for a certain frame is detected so that an NAV of the STA is correctly set;

2) a signal field of a Physical Layer Convergence Protocol (PLCP) header is correctly received so that a type of a response PPDU to be transmitted after a corresponding PPDU is correctly detected and set through a Response Indication field;

3) a duration corresponding to ProbeDelay elapses.

If a newly changed rule is applied to the HEW STA operating in the PS mode, power consumption can be decreased since a channel access can start when only a signal field of a PLCP header is successfully decoded. The PLCP header may also be called as a physical header.

If a certain STA correctly receives a signal field of a physical header and thus correctly sets a type of a Response frame to be transmitted after a corresponding PPDU through a Response Indication field, a first interval can be utilized to defer a channel access without having to use a second interval even if an MPDU of a corresponding PPDU cannot be successfully decoded and thus a Duration field value cannot be correctly identified. The signal field is decoded in a physical layer but the MPDU is decoded in a MAC layer. The type of the Response frame in the received PPDU can be identified when only decoding in the physical layer is successful. The first interval may be shorter than the second interval. This is to decrease power consumption by starting a channel access in much quicker time. The first interval may include a Distributed coordination function (DCF) Interframe Space (DIFS) and the second interval may include an Extended Interframe space (EIFS).

Interframe space (IFS) is a time interval between frames and is used to defer a channel access. A STA determines whether a wireless medium is busy or idle through the use of the carrier sense (CS) function. When the wireless medium is busy, the STA defers the access of the medium during a DIFS or an EIFS. A STA can determine that the medium is busy when a correctly received frame is received. After DIFS expires, the STA tries to access the medium. The correctly received frame is a frame that has successfully decoded. A STA can determine that the medium is busy when an incorrectly received frame is received. After EIFS expires, the STA tries to access the medium. The incorrectly received frame is a frame that has unsuccessfully decoded.

In an embodiment, an intermediately received frame is defined. The intermediately received frame is a frame that has successfully decoded in a physical layer but has unsuccessfully decoded in a MAC layer. This means that a STA can decode a signal field of the frame and can obtain the Response Indication field to identify the type of the Response frame. If the STA receives the intermediately received frame after the STA transitions from a doze state to an awake state, the STA may defer the channel access not during the EIFS but during the DIFS. Since the DIFS is shorter than the EIFS, the STA can access the medium faster.

Figure 26:
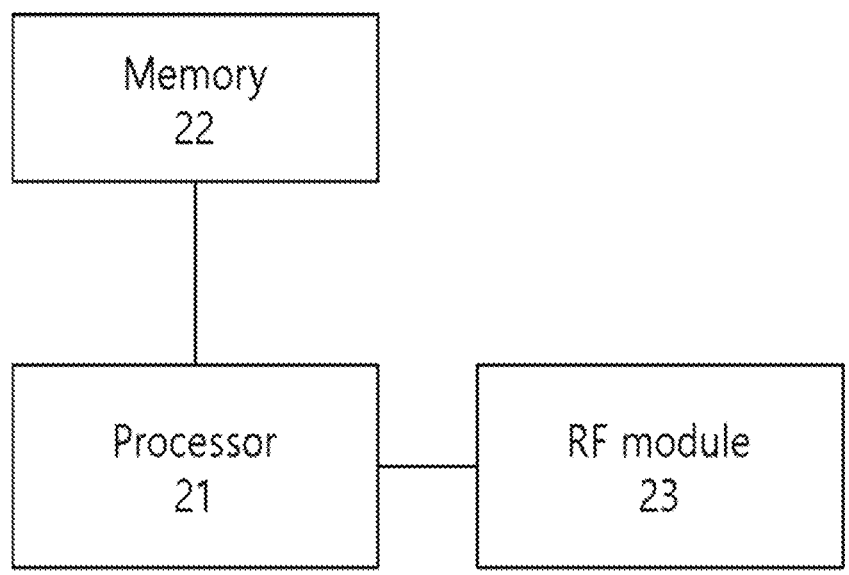
FIG. 26 is a block diagram of an STA according to an embodiment of the present invention.

FIG. 26 is a block diagram of an STA according to an embodiment of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a wireless local area network (LAN), the method comprising:
   receiving, at a station, a beacon frame, the beacon frame comprising at least one basic service set identifier (BSSID) and a first color value, wherein
      each BSSID identifying a basic service set (BSS) managed by an access point (AP) to which the station is associated, and
      the first color value represented by a value number of bits, the value number less than 48;
   receiving, at the station, a physical layer protocol data unit (PPDU) over a transmission bandwidth, the PPDU comprising a First Signal field and a Second Signal field, wherein
      the First Signal field comprising bandwidth information and a second color value, the bandwidth information indicating the transmission bandwidth, and
      the Second Signal field comprising user-specific information comprising allocation for orthogonal frequency division multiple access (OFDMA) transmission;
   wherein
      the First Signal field is phase-rotated and transmitted over at least one first subcarrier group, each first subcarrier group having bandwidth of 20 MHz within the transmission bandwidth, and
      the Second Signal is phase rotated and transmitted over a plurality of second subcarrier groups, each second subcarrier group having bandwidth that is less than 20 MHz within the transmission bandwidth; and
   comparing, at the station, the first color value and the second color value to determine whether the PPDU was transmitted by the AP.

2. The method of claim 1 wherein the PPDU is a multi-user physical layer protocol data unit (MU-PPDU).

3. The method of claim 1 wherein the beacon frame comprises a plurality of BSSIDs, each BSSID identifying a BSS, each BSS associated with the first color value.

4. The method of claim 1 further comprising a step of adjusting a Clear Channel Assessment (CCA) sensitivity level.

5. The method of claim 4, wherein the step of adjusting the CCA sensitivity level comprises:
   determining a first CCA sensitivity level for a primary 20 MHz channel; and
   determining a second CCA sensitivity level for a 40 MHz channel by increasing the first CCA sensitivity level by 3 dB.

6. The method of claim 5 wherein the first CCA sensitivity level has a minimum value of −82 dBm.

7. The method of claim 1 further comprising determining, when the first color value is different from the second color value, whether a channel is to be accessed.

8. The method of claim 1 further comprising determining, when the first color value equals the second color value, that the PPDU was received from the AP.

9. The method of claim 1 further comprising determining, when the first color value is different from the second color value, that the PPDU was received from an AP to which the station is not associated.

10. A device configured for communicating in a wireless local area network (LAN), the device comprising:
   a radio frequency module configured to transmit and receive radio signals;
   a processor operatively coupled with the radio frequency module; and
   memory disposed to said processor, said memory including instructions, when executed by said processor cause the processor to:
      process a beacon frame, the beacon frame comprising at least one basic service set identifier (BSSID) and a first color value, wherein
         each BSSID identifying a basic service set (BSS) managed by an access point (AP) to which the station is associated, and
         the first color value represented by a value number of bits, the value number less than 48;
      process a physical layer protocol data unit (PPDU) over a transmission bandwidth, the PPDU comprising a First Signal field and a Second Signal field, wherein
         the First Signal field comprising bandwidth information and a second color value, the bandwidth information indicating the transmission bandwidth, and
         the Second Signal field comprising user-specific information comprising allocation for orthogonal frequency division multiple access (OFDMA) transmission;
      wherein
         the First Signal field is phase-rotated and transmitted over at least one first subcarrier group, each first subcarrier group having bandwidth of 20 MHz within the transmission bandwidth, and
         the Second Signal is phase rotated and transmitted over a plurality of second subcarrier groups, each second subcarrier group having bandwidth that is less than 20 MHz within the transmission bandwidth; and
      compare the first color value and the second color value to determine whether the PPDU was transmitted by the AP.

11. A device recited in claim 10 wherein the PPDU is a multi-user physical layer protocol data unit (MU-PPDU).

12. A device recited in claim 10 wherein the beacon frame comprises a plurality of BSSIDs, each BSSID identifying a BSS, each BSS associated with the first color value.

13. A device recited in claim 10 wherein the processor is further configured to adjust a Clear Channel Assessment (CCA) sensitivity level.

14. A device recited in claim 13 wherein the processor is further configured to determine a first CCA sensitivity level for a primary 20 MHz channel; and determine a second CCA sensitivity level for a 40 MHz channel by increasing the first CCA sensitivity level by 3 dB.

15. A device recited in claim 14 wherein the first CCA sensitivity level has a minimum value of −82 dBm.

16. A device recited in claim 10 wherein the processor is further configured to determine, when the first color value is different than the second color value, whether a channel is to be accessed.

17. A device recited in claim 10 wherein the processor is configured to determine, when the first color value equals the second color value, that the PPDU was received from the AP.

18. A device recited in claim 10 wherein the processor is configured to determine, when the first color value is different than the second color value, that the PPDU was received from an AP to which the station is not associated.

* * * * *